United States Patent
Sheldon et al.

(10) Patent No.: US 12,472,364 B2
(45) Date of Patent: Nov. 18, 2025

(54) POST-VENTRICULAR ATRIAL BLANKING IN A CARDIAC DEVICE

(71) Applicant: Medtronic, Inc., Minneapolis, MN (US)

(72) Inventors: Todd J. Sheldon, North Oaks, MN (US); Keelia M. Escalante, Minneapolis, MN (US); Aaron M. Saikin, Round Lake, IL (US)

(73) Assignee: Medtronic, Inc., Minneapolis, MN (US)

( * ) Notice: Subject to any disclaimer, the term of this patent is extended or adjusted under 35 U.S.C. 154(b) by 516 days.

(21) Appl. No.: 17/935,885

(22) Filed: Sep. 27, 2022

(65) Prior Publication Data
US 2023/0136887 A1    May 4, 2023

Related U.S. Application Data

(60) Provisional application No. 63/274,323, filed on Nov. 1, 2021.

(51) Int. Cl.
*A61N 1/365* (2006.01)
*A61N 1/375* (2006.01)

(52) U.S. Cl.
CPC ..... *A61N 1/36585* (2013.01); *A61N 1/36542* (2013.01)

(58) Field of Classification Search
CPC .... A61N 1/362; A61N 1/3621; A61N 1/3622; A61N 1/3624; A61N 1/3628; A61N 1/365; A61N 1/36507; A61N 1/36514; A61N 1/36542; A61N 1/36585
See application file for complete search history.

(56) References Cited

U.S. PATENT DOCUMENTS

| | | | |
|---|---|---|---|
| 4,485,813 | A | 12/1984 | Anderson et al. |
| 5,052,388 | A | 10/1991 | Sivula et al. |
| 5,292,341 | A | 3/1994 | Snell |
| 5,480,412 | A | 1/1996 | Mouchawar et al. |
| 5,507,782 | A | 4/1996 | Kieval et al. |
| 5,591,214 | A * | 1/1997 | Lu .................... A61N 1/368  607/9 |
| 5,593,431 | A | 1/1997 | Sheldon |

(Continued)

FOREIGN PATENT DOCUMENTS

| | | |
|---|---|---|
| WO | 2016014352 A1 | 1/2016 |
| WO | 2018165289 A1 | 9/2018 |

OTHER PUBLICATIONS (PCT/IB2022/059820) PCT Notification of Transmittal of the International Search Report and the Written Opinion of the International Searching Authority, Mailed Jan. 9, 2023, 12 pages.

(Continued)

*Primary Examiner* — Brian T Gedeon

(57) ABSTRACT

A medical device is configured to identify a first group of cardiac events, determine a cardiac event interval based on the first group of cardiac events and determine whether the cardiac event interval is less than a threshold interval or greater than the threshold interval. The medical device is configured to select a first blanking period duration if the cardiac event interval is less than the threshold interval or a second blanking period duration if the cardiac event interval is greater than the threshold interval.

23 Claims, 12 Drawing Sheets

(56) References Cited

U.S. PATENT DOCUMENTS

| | | | |
|---|---|---|---|
| 5,658,320 A * | 8/1997 | Betzold | A61N 1/3622 607/14 |
| 5,683,432 A | 11/1997 | Goedeke et al. | |
| 5,885,471 A | 3/1999 | Ruben et al. | |
| 6,044,297 A | 3/2000 | Sheldon et al. | |
| 6,295,471 B1 | 9/2001 | Bornzin et al. | |
| 6,625,490 B1 | 9/2003 | McClure et al. | |
| 7,062,328 B1 | 6/2006 | Levine et al. | |
| 7,130,681 B2 | 10/2006 | Gebhardt et al. | |
| 7,483,745 B2 | 1/2009 | Amblard | |
| 7,848,807 B2 | 12/2010 | Wang | |
| 7,869,876 B2 | 1/2011 | Prakash et al. | |
| 8,214,036 B2 | 7/2012 | Casset | |
| 8,233,981 B2 | 7/2012 | Casset | |
| 8,380,308 B2 | 2/2013 | Rosenberg et al. | |
| 8,433,409 B2 | 4/2013 | Johnson et al. | |
| 8,478,388 B2 | 7/2013 | Nguyen et al. | |
| 8,532,785 B1 | 9/2013 | Crutchfield et al. | |
| 8,541,131 B2 | 9/2013 | Lund et al. | |
| 8,700,181 B2 | 4/2014 | Bornzin et al. | |
| 8,909,329 B2 | 12/2014 | Prakash et al. | |
| 8,923,963 B2 | 12/2014 | Bonner et al. | |
| 8,996,109 B2 | 3/2015 | Karst et al. | |
| 9,272,146 B2 | 3/2016 | Anselmi | |
| 9,278,218 B2 | 3/2016 | Karst et al. | |
| 9,427,594 B1 | 8/2016 | Bornzin et al. | |
| 9,522,280 B2 | 12/2016 | Fishler et al. | |
| 9,775,982 B2 | 10/2017 | Grubac et al. | |
| 10,080,900 B2 | 9/2018 | Ghosh et al. | |
| 10,207,116 B2 | 2/2019 | Sheldon et al. | |
| 10,286,214 B2 | 5/2019 | Demmer et al. | |
| 10,328,270 B2 | 6/2019 | Demmer et al. | |
| 10,449,366 B2 | 10/2019 | Splett et al. | |
| 10,532,212 B2 | 1/2020 | Splett et al. | |
| 10,744,329 B2 | 8/2020 | Sheldon et al. | |
| 2012/0095521 A1 | 4/2012 | Hintz | |
| 2015/0173655 A1 | 6/2015 | Demmer et al. | |
| 2016/0023000 A1 | 1/2016 | Cho et al. | |
| 2016/0114161 A1 | 4/2016 | Amblard et al. | |
| 2017/0274213 A1 | 9/2017 | Ghosh et al. | |
| 2018/0028814 A1 | 2/2018 | Ghosh | |
| 2018/0085588 A1 | 3/2018 | Splett et al. | |
| 2018/0085589 A1 | 3/2018 | Splett et al. | |
| 2018/0117337 A1 | 5/2018 | Splett et al. | |
| 2018/0154154 A1 | 6/2018 | Sheldon et al. | |
| 2018/0161580 A1 | 6/2018 | Demmer et al. | |
| 2019/0083779 A1 | 3/2019 | Yang et al. | |
| 2020/0101297 A1 | 4/2020 | Drake et al. | |
| 2020/0147396 A1 | 5/2020 | Sheldon et al. | |
| 2020/0179707 A1 | 6/2020 | Splett et al. | |
| 2020/0179708 A1 | 6/2020 | Splett et al. | |
| 2020/0316386 A1 | 10/2020 | Demmer et al. | |
| 2021/0236825 A1 | 8/2021 | Sheldon et al. | |
| 2021/0236826 A1 | 8/2021 | Sheldon et al. | |

OTHER PUBLICATIONS

Brown, et al., "Sensing and detection in Medtronic implantable cardioverter defibrillators, " Herzschr Elektrophys 2016—27:193-212, Sep. 8, 2016, 20 pages.

* cited by examiner

POST-VENTRICULAR ATRIAL BLANKING IN A CARDIAC DEVICE

REFERENCE TO RELATED APPLICATIONS

This application claims the benefit of provisional U.S. Patent Application No. 63/274,323, filed on Nov. 1, 2021, the entire contents of which is incorporated by reference herein.

TECHNICAL FIELD

This disclosure relates to a medical device and method for setting a post-ventricular atrial blanking period.

BACKGROUND

Implantable cardiac pacemakers are often placed in a subcutaneous pocket and coupled to one or more transvenous medical electrical leads carrying pacing and sensing electrodes positioned in the heart. A cardiac pacemaker implanted subcutaneously may be a single chamber pacemaker coupled to one transvenous medical lead for positioning electrodes in one heart chamber, atrial or ventricular, or a dual chamber pacemaker coupled to two intracardiac leads for positioning electrodes in both an atrial and a ventricular chamber. Multi-chamber pacemakers are also available that may be coupled to three leads, for example, for positioning electrodes for pacing and sensing in one atrial chamber and both the right and left ventricles.

Intracardiac pacemakers have recently been introduced that are implantable within a ventricular chamber of a patient's heart for delivering ventricular pacing pulses. Such a pacemaker may sense R-wave signals attendant to intrinsic ventricular depolarizations and deliver ventricular pacing pulses in the absence of sensed R-waves. While single chamber ventricular sensing and pacing by an intracardiac ventricular pacemaker may adequately address some patient conditions, some patients may benefit from atrial and ventricular (dual chamber) sensing for providing atrial-synchronized ventricular pacing in order to maintain a regular heart rhythm.

SUMMARY

The techniques of this disclosure generally relate to setting a post-ventricular atrial blanking (PVAB) period in a cardiac device, such as a ventricular pacemaker capable of atrial synchronous ventricular pacing. The device may sense atrial event signals corresponding to the contraction of the atria for triggering the delivery of a ventricular pacing pulse synchronized to the atrial event. In some examples, the medical device may have a motion sensor configured to sense a cardiac motion signal. The medical device may be configured to sense atrial event signals from the motion signal. A medical device operating according to the techniques disclosed herein sets a PVAB period that is applied to the motion signal following ventricular events during which atrial event signals are not sensed from the motion signal. The medical device may be configured to adjust the duration of the PVAB period. In some examples, the medical device may adjust the duration of the PVAB period in response to changes in heart rate and/or changes in the frequency or timing of sensed atrial event signals. In some examples, the medical device may be configured to adjust the duration of the PVAB period following a ventricular event based on an analysis of the amplitude of the motion signal to promote reliable sensing of atrial event signals outside of the PVAB period and promote proper tracking of atrial events by the ventricular pacing pulses that may be generated by the medical device.

In one example, the disclosure provides a medical device including a motion sensor configured to sense a motion signal and a control circuit in communication with the motion signal. The control circuit can be configured to identify a first group of cardiac events, determine a first cardiac event interval based on the first group of cardiac events and determine whether the first cardiac event interval is less than a threshold interval or greater than the threshold interval. The control circuit can be configured to select a first blanking period duration if the first cardiac event interval is less than the threshold interval or a second blanking period duration if the first cardiac event interval is greater than the threshold interval. The second blanking period duration is greater than the first blanking period duration. The control circuit may further be configured to identify a second group of cardiac events occurring after the first group of cardiac events and start a PVAB period that is applied to the motion signal during the second group of cardiac events. The PVAB period may be applied to the motion signal in response to each ventricular event during the second group of cardiac events. The PVAB period that is applied to the motion signal during the second group of cardiac events is set to the selected one of the first blanking period duration or the second blanking period duration.

In another example, the disclosure provides a method that may be performed by a medical device. The method may include sensing a motion signal, identifying a first group of cardiac events, determining a first cardiac event interval based on the first group of cardiac events and determining whether the first cardiac event interval is less than a threshold interval or greater than the threshold interval. The method may further include selecting one of a first blanking period duration if the first cardiac event interval is less than the threshold interval or a second blanking period duration if the first cardiac event interval is greater than the threshold interval. The second blanking period duration can be greater than the first blanking period duration. The method may further include identifying a second group of cardiac events occurring after the first group of cardiac events and applying a PVAB period to the motion signal during the second group of cardiac events. The PVAB period may be applied to the motion signal in response to each ventricular event during the second group of cardiac events. The PVAB period that is applied to the motion signal during the second group of cardiac events is set to the selected one of the first blanking period duration or the second blanking period duration.

In another example, the disclosure provides a non-transitory, computer-readable storage medium storing a set of instructions which, when executed by a control circuit of a medical device, cause the medical device to sense a motion signal, identify a first group of cardiac events, determine a first cardiac event interval based on the first group of cardiac events, and determine whether the first cardiac event interval is less than a threshold interval or greater than the threshold interval. The instructions may further cause the medical device to select one of a first blanking period duration if the first cardiac event interval is less than the threshold interval or a second blanking period duration if the first cardiac event interval is greater than the threshold interval. The second blanking period duration can be greater than the first blanking period duration. The instructions may further cause the medical device to identify a second group of cardiac events occurring after the first group of cardiac events and apply a PVAB period to the motion signal during the second group of cardiac events. The PVAB period may be applied to the motion signal in response to each ventricular event during the second group of cardiac events. The PVAB period that is applied to the motion signal during the second group of cardiac events is set to the selected one of the first blanking period duration or the second blanking period duration.

Further disclosed herein is the subject matter of the following clauses:

1. A medical device comprising: a motion sensor configured to sense a motion signal; a pulse generator configured to generate ventricular pacing pulses; and a control circuit in communication with the motion sensor and the pulse generator, the control circuit configured to: identify a first plurality of cardiac events; determine a first cardiac event interval based on the first plurality of cardiac events; determine whether the first cardiac event interval is less than a threshold interval or greater than the threshold interval; select one of a first blanking period duration if the first cardiac event interval is less than the threshold interval or a second blanking period duration if the first cardiac event interval is greater than the threshold interval, the second blanking period duration being greater than the first blanking period duration; identify a second plurality of cardiac events after the first plurality of cardiac events; and apply a post-ventricular atrial blanking period to the motion signal during the second plurality of cardiac events, the post-ventricular atrial blanking period being set to the selected one of the first blanking period duration or the second blanking period duration.

2. The medical device of clause 1, wherein the control circuit is further configured to: determine a second cardiac event interval from the second plurality of cardiac events; compare the second cardiac event interval to the threshold interval; based on the comparison of the second cardiac event interval to the threshold interval, select one of the first blanking period duration in response to the second cardiac event interval being less than the threshold interval or the second blanking period duration in response to the second cardiac event interval being greater than the threshold interval; identify a third plurality of cardiac events after the second plurality of cardiac events; and apply the post-ventricular atrial blanking period to the motion signal during the third plurality of cardiac events, where the post-ventricular atrial blanking period is set to one of the first blanking period duration or the second blanking period duration that is selected based on the comparison of the second cardiac event interval to the threshold interval.

3. The medical device of any of clauses 1-2, wherein the control circuit is further configured to identify the first plurality of cardiac events by identifying at least one ventricular pacing pulse generated by the pulse generator.

4. The medical device of any of clauses 1-3, further comprising a sensing circuit configured to receive a cardiac electrical signal and sense ventricular events from the cardiac electrical signal wherein the control circuit is configured to identify the first plurality of cardiac events by identifying at least one ventricular event sensed by the sensing circuit.

5. The medical device of any of clauses 1-4, wherein the control circuit is further configured to sense an atrial event signal from the motion signal outside the post-ventricular atrial blanking period; and generate an output in response to sensing the atrial event signal; the medical device further comprising a memory in communication with the control circuit, the memory configured to store the output generated by the control circuit in response to sensing the atrial event signal.

6. The medical device of any of clauses 1-5, wherein the control circuit is further configured to set a power conservation time period during the post-ventricular atrial blanking period; and disable at least a portion of the motion sensor during the power conservation time interval.

7. The medical device of clause 6, wherein the control circuit is further configured to set the power conservation time period to expire a predetermined time interval less than (e.g., earlier than) the post-ventricular atrial blanking period that is set to the selected one of the first blanking period duration or the second blanking period duration.

8. The medical device of any of clauses 1-7, wherein the control circuit is further configured to select the first blanking period duration by selecting a minimum blanking period duration in response to the first cardiac event interval being less than the threshold interval.

9. The medical device of any of clauses 1-8, wherein the control circuit is further configured to select the second blanking period by selecting a maximum blanking period duration in response to the first cardiac event interval being greater than the threshold interval.

10. The medical device of any of clauses 1-9, wherein the control circuit is further configured to determine when the first cardiac event interval is less than the threshold interval; in response to the first cardiac event interval being less than the threshold interval, determine an amplitude of the motion signal during at least one post-ventricular atrial blanking period; determine that the amplitude is greater than a threshold amplitude; in response to the amplitude being greater than the threshold amplitude, withhold selecting the first blanking period duration in response to the first cardiac event interval being less than the threshold interval; and select the second blanking period in response to determining that the amplitude of the motion signal is greater than the threshold amplitude when the first cardiac event interval is less than the threshold interval.

11. The medical device of any of clauses 1-10, wherein the control circuit is further configured to determine an amplitude of the motion signal; and set the first blanking period duration based on the amplitude of the motion signal.

12. The medical device of any of clauses 1-11, wherein the control circuit is further configured to determine a time of one of a peak amplitude or a threshold amplitude crossing of the motion signal; and set the first blanking period duration based on the determined time.

13. The medical device of any of clauses 1-12, wherein the control circuit is further configured to wait for one of a predetermined time interval or a predetermined number of cardiac event intervals; identify a second plurality of cardiac events; determine a second cardiac event interval from the second plurality of cardiac events; and adjust the post-ventricular atrial blanking period based on the second cardiac event interval after waiting for the one of the predetermined time interval or the predetermined number of cardiac event intervals.

14. The medical device of any of clauses 1-13, wherein the control circuit is further configured to select the threshold interval from one of a first longer threshold interval and a second shorter threshold interval based on a current duration of the post-ventricular atrial blanking period.

15. The medical device of any of clauses 1-14, wherein the control circuit is further configured to sense an atrial event signal from the motion signal after an expiration of the post-ventricular atrial blanking period; and the pulse generator is configured to generate a ventricular pacing pulse in response to the control circuit sensing the atrial event signal.

16. A method, comprising: sensing a motion signal; identifying a first plurality of cardiac events; determining a first cardiac event interval based on the first plurality of cardiac events; determining whether the first cardiac event interval is less than a threshold interval or greater than the threshold interval; selecting one of a first blanking period duration if the first cardiac event interval is less than the threshold interval or a second blanking period duration if the first cardiac event interval is greater than the threshold interval, the second blanking period duration being greater than the first blanking period duration; identifying a second plurality of cardiac events after the first plurality of cardiac events; and applying a post-ventricular atrial blanking period to the motion signal during the second plurality of cardiac events, the post-ventricular atrial blanking period being set to the selected one of the first blanking period duration or the second blanking period duration.

17. The method of clause 16, further comprising: determining a second cardiac event interval from the second plurality of cardiac events; comparing the second cardiac event interval to the threshold interval; based on the comparing of the second cardiac event interval to the threshold interval, selecting one of the first blanking period duration in response to the second cardiac event interval being less than the threshold interval or the second blanking period duration in response to the second cardiac event interval being greater than the threshold interval; identifying a third plurality of cardiac events after the second plurality of cardiac events; and applying the post-ventricular atrial blanking period to the motion signal during the third plurality of cardiac events, where the post-ventricular atrial blanking period is set to the selected one of the first blanking period duration or the second blanking period duration that is selected based on the comparison of the second cardiac event interval to the threshold interval.

18. The method of any of clauses 16-17, further comprising generating ventricular pacing pulses and identifying the first plurality of cardiac events by identifying at least one ventricular pacing pulse.

19. The method of any of clauses 16-18, further comprising receiving a cardiac electrical signal; sensing ventricular events from the cardiac electrical signal; and identifying the first plurality of cardiac events by identifying at least one ventricular event sensed by the sensing circuit.

20. The method of any of clauses 16-19, further comprising sensing an atrial event signal from the motion signal outside the post-ventricular atrial blanking period; generating an output in response to sensing the atrial event signal; and storing in a memory the output generated in response to sensing the atrial event signal.

21. The method of any of clauses 16-20, further comprising setting a power conservation time period during the post-ventricular atrial blanking period; and disabling at least a portion of the motion sensor during the power conservation time interval.

22. The method of clause 21, further comprising setting the power conservation time period to expire a predetermined time interval earlier than the post-ventricular atrial blanking period.

23. The method of any of clauses 16-22, wherein selecting the first blanking period duration comprises selecting a minimum blanking period duration in response to the first cardiac event interval being less than the threshold interval.

24. The method of any of clauses 16-23, wherein selecting the second blanking period duration comprises selecting a maximum blanking period duration in response to the first cardiac event interval being greater than the threshold interval.

25. The method of any of clauses 16-24, further comprising determining when the first cardiac event interval is less than the threshold interval; in response to the first cardiac event interval being less than the threshold interval, determining an amplitude of the motion signal during at least one post-ventricular atrial blanking period; determining that the amplitude is greater than a threshold amplitude; in response to the amplitude being greater than the threshold amplitude, withholding selecting the first blanking period duration in response to the first cardiac event interval being less than the threshold interval; and selecting the second blanking period in response to determining that the amplitude of the motion signal is greater than the threshold amplitude when the first cardiac event interval is less than the threshold interval.

26. The method of any of clauses 16-25, further comprising determining an amplitude of the motion signal and setting the first blanking period duration based on the amplitude of the motion signal.

27. The method of any of clauses 16-26, further comprising determining a time of one of a peak amplitude or a threshold amplitude crossing of the motion signal and setting the first blanking period duration based on the determined time.

28. The method of any of clauses 16-27, further comprising waiting for one of a predetermined time interval or a predetermined number of cardiac event intervals; identifying a second plurality of cardiac events; determining a second cardiac event interval from the second plurality of cardiac events; and adjusting the post-ventricular atrial blanking period based on the second cardiac event interval after waiting for the one of the predetermined time interval or the predetermined number of cardiac event intervals.

29. The method of any of clauses 16-28, further comprising selecting the threshold interval from one of a first threshold interval and a second threshold interval that is shorter than the first threshold interval based on a current duration of the post-ventricular atrial blanking period.

30. The method of any of clauses 16-29, further comprising sensing an atrial event signal from the motion signal after an expiration of the post-ventricular atrial blanking period and generating a ventricular pacing pulse in response to the control circuit sensing the atrial event signal.

31. A non-transitory, computer-readable medium storing a set of instructions that, when executed by a control circuit of a medical device, cause the medical device to: sense a motion signal; identify a first plurality of cardiac events; determine a first cardiac event interval based on the first plurality of cardiac events; determine whether the first cardiac event interval is less than a threshold interval or greater than the threshold interval; select one of a first blanking period duration if the first cardiac event interval is less than the threshold interval or a second blanking period duration if the first cardiac event interval is greater than the threshold interval, the second blanking period duration being greater than the first blanking period duration; identify a second plurality of cardiac events after the first plurality of cardiac events; and apply a post-ventricular atrial blanking period to the motion signal during the second plurality of cardiac events, the post-ventricular atrial blanking period being set to the selected one of the first blanking period duration or the second blanking period duration.

32. The non-transitory, computer-readable medium of clause 31, further comprising instructions that cause the medical device to determine a second cardiac event interval from the second plurality of cardiac events; compare the second cardiac event interval to the threshold interval; based on the comparing of the second cardiac event interval to the threshold interval, select one of the first blanking period duration in response to the second cardiac event interval being less than the threshold interval or the second blanking period duration in response to the second cardiac event interval being greater than the threshold interval; identify a third plurality of cardiac events after the second plurality of cardiac events; and apply the post-ventricular atrial blanking period to the motion signal during the third plurality of cardiac events, where the post-ventricular atrial blanking period is set to the selected one of the first blanking period duration or the second blanking period duration that is selected based on the comparison of the second cardiac event interval to the threshold interval.

33. The non-transitory, computer-readable medium of any of clauses 31-32, further comprising instructions that cause the medical device to generate ventricular pacing pulses and identify the first plurality of cardiac events by identifying at least one ventricular pacing pulse.

34. The non-transitory, computer-readable medium of any of clauses 31-33, further comprising instructions that cause the medical device to receive a cardiac electrical signal; sense ventricular events from the cardiac electrical signal; and identify the first plurality of cardiac events by identifying at least one ventricular event sensed by the sensing circuit.

35. The non-transitory, computer-readable medium of any of clauses 31-34, further comprising instructions that cause the medical device to sense an atrial event signal from the motion signal outside the post-ventricular atrial blanking period; generate an output in response to sensing the atrial event signal; and store in a memory of the medical device the output generated in response to sensing the atrial event signal.

36. The non-transitory, computer-readable medium of any of clauses 30-35, further comprising instructions that cause the medical device to set a power conservation time period during the post-ventricular atrial blanking period; and disable at least a portion of the motion sensor during the power conservation time interval.

37. The non-transitory, computer-readable medium of clause 36, further comprising instructions that cause the medical device to set the power conservation time period to expire a predetermined time interval earlier than the post-ventricular atrial blanking period.

38. The non-transitory, computer-readable medium of any of clauses 30-37, further comprising instructions that cause the medical device to select the first blanking period duration by selecting a minimum blanking period duration in response to the first cardiac event interval being less than the threshold interval.

39. The non-transitory, computer-readable medium of any of clauses 30-38, further comprising instructions that cause the medical device to select the second blanking period duration by selecting a maximum blanking period duration in response to the first cardiac event interval being greater than the threshold interval.

40. The non-transitory, computer-readable medium of any of clauses 30-39, further comprising instructions that cause the medical device to determine when the first cardiac event interval is less than the threshold interval; in response to the first cardiac event interval being less than the threshold interval, determine an amplitude of the motion signal during at least one post-ventricular atrial blanking period; determine that the amplitude is greater than a threshold amplitude; in response to the amplitude being greater than the threshold amplitude, withhold selecting the first blanking period duration in response to the first cardiac event interval being less than the threshold interval; and select the second blanking period in response to determining that the amplitude of the motion signal is greater than the threshold amplitude when the first cardiac event interval is less than the threshold interval.

41. The non-transitory, computer-readable medium of any of clauses 30-40, further comprising instructions that cause the medical device to determine an amplitude of the motion signal; and set the first blanking period duration based on the amplitude of the motion signal.

42. The non-transitory, computer-readable medium of any of clauses 30-41, further comprising instructions that cause the medical device to determine a time of one of a peak amplitude or a threshold amplitude crossing of the motion signal; and set the first blanking period duration based on the determined time.

43. The non-transitory, computer-readable medium of any of clauses 31-42, further comprising instructions that cause the medical device to wait for one of a predetermined time interval or a predetermined number of cardiac event intervals; identify a second plurality of cardiac events; determine a second cardiac event interval from the second plurality of cardiac events; and adjust the post-ventricular atrial blanking period based on the second cardiac event interval after waiting for the one of the predetermined time interval or the predetermined number of cardiac event intervals.

44. The non-transitory, computer-readable medium of any of clauses 30-43, further comprising instructions that cause the medical device to select the threshold interval from one of a first threshold interval and a second threshold interval that is shorter than the first threshold interval based on a current duration of the post-ventricular atrial blanking period.

45. The non-transitory, computer-readable medium of any of clauses 30-44, further comprising instructions that cause the medical device to sense an atrial event signal from the motion signal after an expiration of the post-ventricular atrial blanking period; and generate a ventricular pacing pulse in response to the control circuit sensing the atrial event signal.

46. A medical device comprising: a motion sensor configured to sense a motion signal; a pulse generator configured to generate ventricular pacing pulses; and a control circuit coupled to the motion sensor to receive the motion signal and configured to: identify a plurality of ventricular events; set a post-ventricular atrial blanking period following each of the plurality of ventricular events; determine an amplitude of the motion signal sensed by the motion sensor during at least one post-ventricular atrial blanking period of the post-ventricular atrial blanking periods; and adjust the post-ventricular atrial blanking period based on the determined amplitude of the motion signal.

47. The medical device of clause 46, wherein the control circuit is further configured to identify the plurality of ventricular events by identifying at least one ventricular pacing pulse generated by the pulse generator.

48. The medical device of any of clauses 46-47, further comprising a sensing circuit configured to receive a cardiac electrical signal and sense ventricular events from the cardiac electrical signal, wherein the control circuit is configured to identify the plurality of ventricular events by identifying at least one ventricular event sensed by the sensing circuit.

49. The medical device of any of clauses 46-48, wherein the control circuit is further configured to: determine the amplitude by determining a peak amplitude from the motion signal sensed during at least a portion of the at least one post-ventricular atrial blanking period; determine whether the peak amplitude is less than an amplitude threshold; and adjust the post-ventricular atrial blanking period by shortening the post-ventricular atrial blanking period in response to the peak amplitude being less than the amplitude threshold.

50. The medical device of any of clauses 46-49, wherein the control circuit is further configured to: determine the amplitude by determining a peak amplitude from the motion signal sensed during at least a portion of the at least one post-ventricular atrial blanking period; determine whether the peak amplitude is greater than to an amplitude threshold; and adjust the post-ventricular atrial blanking period by increasing the post-ventricular atrial blanking period in response to the peak amplitude being greater than the amplitude threshold.

51. The medical device of any of clauses 56-50, wherein the control circuit is further configured to adjust the post-ventricular atrial blanking period by adjusting the duration of a post-ventricular atrial blanking period applicable to a future cardiac cycle.

52. The medical device of any of clauses 46-51, wherein the control circuit is further configured to: determine the amplitude by detecting a latest amplitude threshold crossing by the motion signal during the at least one post-ventricular atrial blanking period; determine that the amplitude threshold crossing is earlier than a threshold time interval from an expiration of the post-ventricular atrial blanking period; and adjust the post-ventricular atrial blanking period by shortening the post-ventricular atrial blanking period in response to the amplitude threshold crossing being earlier than the threshold time interval from the expiration of the post-ventricular atrial blanking period.

53. The medical device of clause 52, wherein the control circuit is configured to set the threshold time interval based on a decrement interval used to adjust the post-ventricular atrial blanking period.

54. The medical device of any of clauses 46-53, wherein the control circuit is further configured to: detect a change in a heart rate; and determine the amplitude of the motion signal in response to detecting the change in the heart rate.

55. The medical device of any of clauses 46-54, wherein the control circuit is further configured to: set an amplitude analysis window during the at least one post-ventricular atrial blanking period; determine the amplitude by determining a peak amplitude of the motion signal sensed during the amplitude analysis window; determine that the peak amplitude is less than an amplitude threshold; and adjust the post-ventricular atrial blanking period by shortening the post-ventricular atrial blanking period in response to the peak amplitude being less than the amplitude threshold.

56. The medical device of any of clauses 46-55, wherein the control circuit is further configured to: detect a decrease in a heart rate; increase the post-ventricular atrial blanking period in response to detecting the decrease in the heart rate; detect an increase in the heart rate; and based on the determined amplitude and the increase in the heart rate adjust the post-ventricular atrial blanking period by decreasing the post-ventricular atrial blanking period or hold the post-ventricular atrial blanking period constant.

57. The medical device of any of clauses 46-56, wherein the control circuit is further configured to: set a post-ventricular atrial blanking ending time interval that begins prior to an expiration time of the at least one post-ventricular atrial blanking period; and determine the amplitude by comparing the motion signal sensed during the post-ventricular atrial blanking ending time interval to an amplitude threshold.

58. The medical device of clause 57, wherein the control circuit is further configured to: based on the comparing of the motion signal to the amplitude threshold sensed during the post-ventricular atrial blanking ending time interval: decrease the post-ventricular atrial blanking period in response to the motion signal not crossing the amplitude threshold during the post-ventricular atrial blanking ending time interval or hold the post-ventricular atrial blanking period constant in response to the motion signal crossing the amplitude threshold during the post-ventricular atrial blanking ending time interval.

59. The medical device of any of clauses 46-58, wherein the control circuit is further configured to: disable motion signal sensing by the motion sensor during each of a first plurality of the post-ventricular atrial blanking periods; detect a change in a heart rate; in response to detecting the change in heart rate, enable motion signal sensing by the motion sensor during at least a portion of the at least one post-ventricular atrial blanking period.

60. The medical device of any of clauses 46-59, wherein the control circuit is further configured to: sense atrial event signals from the motion signal outside of the post-ventricular atrial blanking periods; detect a change in at least one of a frequency and a timing of the atrial event signals sensed from the motion signal; and determine the amplitude of the motion signal sensed during the at least one post-ventricular atrial blanking period in response to detecting the change in at least one of the frequency and the timing of the atrial event signals sensed from the motion signal.

61. The medical device of any of clauses 46-60, wherein the control circuit is further configured to: determine that the amplitude of the motion signal is greater than an amplitude threshold during a threshold time interval from an expiration of the at least one post-ventricular atrial blanking period; and adjust the post-ventricular atrial blanking period by increasing the post-ventricular atrial blanking period in response to the amplitude of the motion signal being greater than the amplitude threshold during the threshold time interval from the expiration of the at least one post-ventricular atrial blanking period.

62. The medical device of any of clauses 46-61, wherein the control circuit is further configured to sense an atrial event signal from the motion signal after an expiration of the post-ventricular atrial blanking period; and the pulse generator is configured to generate a ventricular pacing pulse in response to the control circuit sensing the atrial event signal.

63. A method comprising: sensing a motion signal; identifying a plurality of ventricular events; setting a post-ventricular atrial blanking period following each of a plurality of ventricular events; determining an amplitude of the motion signal sensed during at least one post-ventricular atrial blanking period of the post-ventricular atrial blanking periods; and adjusting the post-ventricular atrial blanking period based on the determined amplitude of the motion signal.

64. The method of clause 63, further comprising generating ventricular pacing pulses, wherein identifying the plurality of ventricular events comprises identifying at least one ventricular pacing pulse.

65. The method of any of clauses 63-64, further comprising: receiving a cardiac electrical signal; sensing ventricular events from the cardiac electrical signal; and identifying the plurality of ventricular events by identifying at least ventricular event sensed from the cardiac electrical signal.

66. The method of any of clauses 63-65, further comprising: determining the amplitude by determining a peak amplitude from the motion signal sensed during at least a portion of the at least one post-ventricular atrial blanking period; determining whether the peak amplitude is less than an amplitude threshold; and adjusting the post-ventricular atrial blanking period by shortening the post-ventricular atrial blanking period in response to the peak amplitude being less than the amplitude threshold.

67. The method of any of clauses 63-66, further comprising: determining the amplitude by determining a peak amplitude of the motion signal sensed during at least a portion of the at least one post-ventricular atrial blanking period; determining whether the peak amplitude is greater than an amplitude threshold; and adjusting the post-ventricular atrial blanking period by increasing the post-ventricular atrial blanking period in response to the peak amplitude being greater than the amplitude threshold.

68. The method of any of clauses 63-67, further comprising adjusting the post-ventricular atrial blanking period by adjusting the duration of a post-ventricular atrial blanking period applicable to a future cardiac cycle.

69. The method of any of clauses 63-68, further comprising: determining the amplitude by detecting a latest amplitude threshold crossing by the motion signal during the post-ventricular atrial blanking period; determining that the amplitude threshold crossing is earlier than a threshold time interval from an expiration of the post-ventricular atrial blanking period; and adjusting the post-ventricular atrial blanking period by shortening the post-ventricular atrial blanking period in response to the amplitude threshold crossing being earlier than the threshold time interval from the expiration of the post-ventricular atrial blanking period.

70. The method of clause 69, further comprising setting the threshold time interval based on a decrement interval used to adjust the post-ventricular atrial blanking period.

71. The method of any of clauses 63-70, further comprising: detecting a change in a heart rate; and determining the amplitude of the motion signal in response to detecting the change in the heart rate.

72. The method of any of clauses 63-71, further comprising: setting an amplitude analysis window during the at least one post-ventricular atrial blanking period; determining the amplitude by determining a peak amplitude during the amplitude analysis window; determining that the peak amplitude is less than an amplitude threshold; and adjusting the post-ventricular atrial blanking period by shortening the post-ventricular atrial blanking period in response to the peak amplitude being less than the amplitude threshold.

73. The method of any of clauses 63-72, further comprising: detecting a decrease in a heart rate; increasing the post-ventricular atrial blanking period in response to detecting the decrease in the heart rate; detecting an increase in the heart rate; and based on the determined amplitude and the increase in the heart rate: adjusting the post-ventricular atrial blanking period by decreasing the post-ventricular atrial blanking period, or holding the post-ventricular atrial blanking period constant.

74. The method of any of clauses 63-73, further comprising: setting a post-ventricular atrial blanking ending time interval that begins before an expiration time of the at least one post-ventricular atrial blanking period; and determining the amplitude by comparing the motion signal sensed during the post-ventricular atrial blanking ending time interval to an amplitude threshold.

75. The method of clause 74, further comprising: based on the comparing of the motion signal to the amplitude threshold during the post-ventricular atrial blanking ending time interval: decreasing the post-ventricular atrial blanking period in response to the motion signal not crossing the amplitude threshold during the post-ventricular atrial blanking ending time interval; or holding the post-ventricular atrial blanking period constant in response to the motion signal crossing the amplitude threshold during the post-ventricular atrial blanking ending time interval.

76. The method of any of clauses 63-75, further comprising: disabling motion signal sensing by the motion sensor during each of a first plurality of the post-ventricular atrial blanking periods; detecting a change in a heart rate; and in response to detecting the change in heart rate, enabling motion signal sensing by the motion sensor during at least a portion of the at least one post-ventricular atrial blanking period.

77. The method of any of clauses 63-76, further comprising sensing atrial event signals from the motion signal outside of the post-ventricular atrial blanking periods; detecting a change in at least one of a frequency and a timing of the atrial event signals sensed from the motion signal; and determining the amplitude of the motion signal sensed during the at least one post-ventricular atrial blanking period in response to detecting the change in at least one of the frequency and the timing of the atrial event signals sensed from the motion signal.

78. The method of any of clauses 63-77, further comprising: determining that the amplitude of the motion signal is greater than an amplitude threshold during a threshold time interval from an expiration of the at least one post-ventricular atrial blanking period; and adjusting the post-ventricular atrial blanking period by increasing the post-ventricular atrial blanking period in response to the amplitude of the motion signal being greater than the amplitude threshold during the threshold time interval from the expiration of the at least one post-ventricular atrial blanking period.

79. The method of any of clauses 63-78, further comprising: sensing an atrial event signal from the motion signal after an expiration of the post-ventricular atrial blanking period; and generating a ventricular pacing pulse in response to sensing the atrial event signal.

80. A non-transitory, computer-readable medium storing instructions which, when executed by a processor of a medical device, cause the medical device to: sense a motion signal; identify a plurality of ventricular events; set a post-ventricular atrial blanking period following each of the plurality of ventricular events; determine an amplitude of the motion signal sensed during at least one post-ventricular atrial blanking period of the post-ventricular atrial blanking periods; and adjust the post-ventricular atrial blanking period based on the determined amplitude of the motion signal.

81. The non-transitory, computer-readable medium of clause 80, wherein the instructions further cause the medical device to: generate ventricular pacing pulses; and identify the plurality of ventricular events by identifying at least one ventricular pacing pulse.

82. The non-transitory, computer-readable medium of any of clauses 80-81, wherein the instructions further cause the medical device to: receive a cardiac electrical signal; sense ventricular events from the cardiac electrical signal; and identify the plurality of ventricular events by identifying at least ventricular event sensed from the cardiac electrical signal.

83. The non-transitory, computer-readable medium of any of clauses 80-82, wherein the instructions further cause the medical device to: determine the amplitude by determining a peak amplitude from the motion signal sensed during at least a portion of the at least one post-ventricular atrial blanking period; determine whether the peak amplitude is less than an amplitude threshold; and adjust the post-ventricular atrial blanking period by shortening the post-ventricular atrial blanking period in response to the peak amplitude being less than the amplitude threshold.

84. The non-transitory, computer-readable medium of any of clauses 80-83, wherein the instructions further cause the medical device to: determine the amplitude by determining a peak amplitude of the motion signal sensed during at least a portion of the at least one post-ventricular atrial blanking period; determine whether the peak amplitude is greater than an amplitude threshold; and adjust the post-ventricular atrial blanking period by increasing the post-ventricular atrial blanking period in response to the peak amplitude being greater than the amplitude threshold.

85. The non-transitory, computer-readable medium of any of clauses 80-84, wherein the instructions further cause the medical device to adjust the post-ventricular atrial blanking period by adjusting the duration of a post-ventricular atrial blanking period applicable to a future cardiac cycle.

86. The non-transitory, computer-readable medium of any of clauses 80-85, wherein the instructions further cause the medical device to: determine the amplitude by detecting a latest amplitude threshold crossing by the motion signal during the post-ventricular atrial blanking period; determine that the amplitude threshold crossing is earlier than a threshold time interval from an expiration of the post-ventricular atrial blanking period; and adjust the post-ventricular atrial blanking period by shortening the post-ventricular atrial blanking period in response to the amplitude threshold crossing being earlier than the threshold time interval from the expiration of the post-ventricular atrial blanking period.

87. The non-transitory, computer-readable medium of clause 86, wherein the instructions further cause the medical device to set the threshold time interval based on a decrement interval used to adjust the post-ventricular atrial blanking period.

88. The non-transitory, computer-readable medium of any of clauses 80-87, wherein the instructions further cause the medical device to: detect a change in a heart rate; and determine the amplitude of the motion signal in response to detecting the change in the heart rate.

89. The non-transitory, computer-readable medium of any of clauses 80-88, wherein the instructions further cause the medical device to: set an amplitude analysis window during the at least one post-ventricular atrial blanking period; determine the amplitude by determining a peak amplitude during the amplitude analysis window; determine that the peak amplitude is less than an amplitude threshold; and adjust the post-ventricular atrial blanking period by shortening the post-ventricular atrial blanking period in response to the peak amplitude being less than the amplitude threshold.

90. The non-transitory, computer-readable medium of any of clauses 80-89, wherein the instructions further cause the medical device to: detect a decrease in a heart rate; increase the post-ventricular atrial blanking period in response to detecting the decrease in the heart rate; detect an increase in the heart rate; and based on the determined amplitude and the increase in the heart rate: adjust the post-ventricular atrial blanking period by decreasing the post-ventricular atrial blanking period, or hold the post-ventricular atrial blanking period constant.

91. The non-transitory, computer-readable medium of any of clauses 80-90, wherein the instructions further cause the medical device to: set a post-ventricular atrial blanking ending time interval that begins before an expiration time of the at least one post-ventricular atrial blanking period; and determine the amplitude by comparing the motion signal sensed during the post-ventricular atrial blanking ending time interval to an amplitude threshold.

92. The non-transitory, computer-readable medium of clause 91, wherein the instructions further cause the medical device to: based on the comparing of the motion signal to the amplitude threshold during the post-ventricular atrial blanking ending time interval: decrease the post-ventricular atrial blanking period in response to the motion signal not crossing the amplitude threshold during the post-ventricular atrial blanking ending time interval; or hold the post-ventricular atrial blanking period constant in response to the motion signal crossing the amplitude threshold during the post-ventricular atrial blanking ending time interval.

93. The non-transitory, computer-readable medium of any of clauses 80-92, wherein the instructions further cause the medical device to: disable motion signal sensing by the motion sensor during each of a first plurality of the post-ventricular atrial blanking periods; detect a change in a heart rate; and in response to detecting the change in heart rate, enable motion signal sensing by the motion sensor during at least a portion of the at least one post-ventricular atrial blanking period.

94. The non-transitory, computer-readable medium of any of clauses 80-93, wherein the instructions further cause the medical device to: sense atrial event signals from the motion signal outside of the post-ventricular atrial blanking periods; detect a change in at least one of a frequency and a timing of the atrial event signals sensed from the motion signal; and determine the amplitude of the motion signal sensed during the at least one post-ventricular atrial blanking period in response to detecting the change in at least one of the frequency and the timing of the atrial event signals sensed from the motion signal.

95. The non-transitory, computer-readable medium of any of clauses 80-94, wherein the instructions further cause the medical device to: determine that the amplitude of the motion signal is greater than an amplitude threshold during a threshold time interval from an expiration of the at least one post-ventricular atrial blanking period; and adjust the post-ventricular atrial blanking period by increasing the post-ventricular atrial blanking period in response to the amplitude of the motion signal being greater than the amplitude threshold during the threshold time interval from the expiration of the at least one post-ventricular atrial blanking period.

96. The non-transitory, computer-readable medium of any of clauses 80-95, wherein the instructions further cause the medical device to: sense an atrial event signal from the motion signal after an expiration of the post-ventricular atrial blanking period; and generate a ventricular pacing pulse in response to sensing the atrial event signal.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

In general, this disclosure describes techniques for adjusting a PVAB period by a medical device. As described below, atrial event signals that correspond to atrial systole, e.g., atrial myocardial depolarization or atrial contraction, may be sensed from a cardiac signal by a ventricular pacemaker configured to deliver atrial synchronized ventricular pacing. The atrial event signal may be sensed from a variety of cardiac signals, e.g., by sensing an atrial P-wave attendant to atrial myocardial depolarization from a cardiac electrical signal or sensing an atrial systolic event signal attendant to atrial contraction from a cardiac motion signal. In some examples, the cardiac motion signal is an acceleration signal sensed by an accelerometer.

A ventricular pacemaker, which may be wholly implantable within a ventricular heart chamber may include a motion sensor such as an accelerometer for sensing a cardiac motion signal, e.g., an intraventricular motion signal. Atrial event signals corresponding to atrial mechanical contraction and the active filling phase of the ventricle, sometimes referred to as the "atrial kick," can be detected from the motion signal sensed from within the ventricle for use in controlling the timing of ventricular pacing pulses synchronized to atrial events. The techniques disclosed herein provide techniques for promoting reliable sensing of atrial event signals without falsely sensing ventricular event signals associated with ventricular systole by setting and adjusting a PVAB period.

Figure 1:
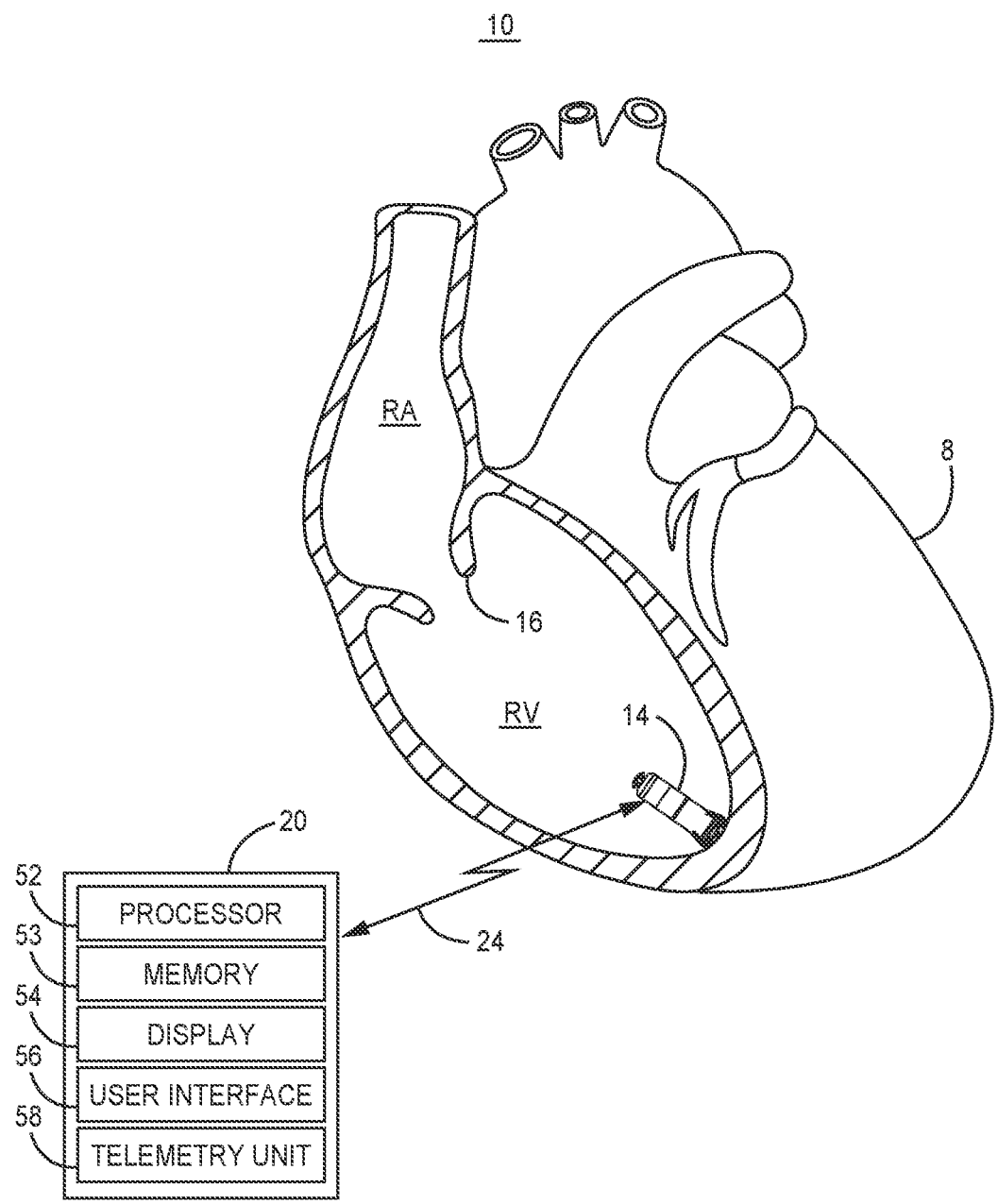
FIG. 1 is a conceptual diagram illustrating a medical device system that may be used to sense cardiac electrical signals and motion signals induced by cardiac motion and flowing blood and provide pacing therapy to a patient's heart.

FIG. 1 is a conceptual diagram illustrating an implantable medical device (IMD) system 10 that may be used to sense cardiac electrical signals and motion signals induced by cardiac motion and flowing blood and provide pacing therapy to a patient's heart 8. IMD system 10 includes a ventricular intracardiac pacemaker 14. Pacemaker 14 may be a transcatheter intracardiac pacemaker which is adapted for implantation wholly within a heart chamber, e.g., wholly within the right ventricle (RV) or wholly within the left ventricle (LV) of heart 8 for sensing cardiac signals and delivering ventricular pacing pulses. Pacemaker 14 may be reduced in size compared to subcutaneously implanted pacemakers and may be generally cylindrical in shape to enable transvenous implantation via a delivery catheter.

Pacemaker 14 is shown positioned in the RV, along an endocardial wall, e.g., near the RV apex though other locations are possible. The techniques disclosed herein are not limited to the pacemaker location shown in the example of FIG. 1. For example, pacemaker 14 may be positioned along the interventricular septal wall. Pacemaker 14 may be positioned within or on the RV or LV to provide respective right ventricular or left ventricular pacing and for sensing cardiac motion signals by a motion sensor from a ventricular location for providing atrial synchronized ventricular pacing. In some examples, pacemaker 14 may be adapted for implantation in the right atrium for delivering ventricular pacing pulses via a tip electrode that is advanced into the area of the bundle of His for delivering pacing pulses that capture the native ventricular conduction system and/or ventricular myocardial tissue. Various examples of a pacemaker configured for delivering atrial synchronous ventricular pacing from an atrial chamber implant site are generally described in U.S. Patent Publication No. 2019/0083779 (Yang, et al.), incorporated herein by reference in its entirety.

Pacemaker 14 is capable of producing electrical stimulation pulses, e.g., pacing pulses, delivered to heart 8 via one or more electrodes on the outer housing of the pacemaker. Pacemaker 14 may be a leadless pacemaker configured to deliver ventricular pacing pulses and sense a cardiac electrical signal using housing based electrodes for producing an intracardiac electrogram (EGM) signal. The cardiac electrical signals may be sensed using the housing based electrodes that are also used to deliver ventricular pacing pulses.

According to the techniques described herein, atrial systolic events e.g., contractions, that can be associated with the active ventricular filling phase are detected by pacemaker 14 from a motion sensor signal such as an acceleration signal sensed by an accelerometer enclosed by the housing of pacemaker 14. The motion signal produced by an accelerometer implanted within a ventricular chamber, which may be referred to as an "intraventricular motion signal," includes motion signals caused by ventricular and atrial events. For example, acceleration of blood flowing into the RV through the tricuspid valve 16 between the RA and RV caused by atrial systole, and referred to as the "atrial kick," may be detected by pacemaker 14 from the acceleration signal produced by an accelerometer included in pacemaker 14. Other cardiac motion signals that may be detected by pacemaker 14, such as motion signals caused by ventricular contraction, ventricular relaxation, and passive ventricular filling, are described below in conjunction with FIG. 4.

Pacemaker 14 is configured to control the delivery of ventricular pacing pulses in a manner that promotes synchrony between atrial activation and ventricular activation, e.g., by maintaining a target atrioventricular (AV) interval between atrial events and ventricular pacing pulses. That is, pacemaker 14 controls pacing pulse delivery to maintain a desired AV interval between a time of sensing an atrial event signal corresponding to atrial systole and the time of generating a ventricular pacing pulse delivered to cause ventricular depolarization and ventricular systole.

A target AV interval may be a default value or a programmed value selected by a clinician and can be the time interval from the detection of the atrial event until delivery of the ventricular pacing pulse. In some instances, the target AV interval may be started from the time the atrial systolic event is detected based on a motion sensor signal or starting from an identified fiducial point of the atrial event signal. The target AV interval may be identified as being hemodynamically optimal for a given patient based on clinical testing or assessments of the patient or based on clinical data from a population of patients. The target AV interval may be determined to be optimal based on relative timing of electrical and mechanical events as identified from the cardiac electrical signal received by pacemaker 14 and the motion sensor signal received by pacemaker 14.

Pacemaker 14 may be capable of bidirectional wireless communication with an external device 20 for programming the AV pacing interval and other pacing control parameters as well as cardiac event sensing parameters, which may be utilized for detecting ventricular mechanical events and/or the atrial systolic event from the motion sensor signal. External device 20 is often referred to as a "programmer" because it is typically used by a physician, technician, nurse, clinician or other qualified user for programming operating parameters in pacemaker 14. External device 20 may be located in a clinic, hospital or other medical facility. External device 20 may alternatively be embodied as a home monitor or a handheld device that may be used in a medical facility, in the patient's home, or another location. Operating parameters, including sensing and therapy delivery control parameters, may be programmed into pacemaker 14 using external device 20.

External device 20 may include a processor 52, memory 53, display 54, user interface 56 and telemetry unit 58. Processor 52 controls external device operations and processes data and signals received from pacemaker 14. Display unit 54 may generate a display, which may include a graphical user interface, of data and information relating to pacemaker functions to a user for reviewing pacemaker operation and programmed parameters as well as cardiac electrical signals, cardiac motion signals or other physiological data that may be acquired by pacemaker 14 and transmitted to external device 20 during an interrogation session. User interface 56 may include a mouse, touch screen, keypad or the like to enable a user to interact with external device 20 to initiate a telemetry session with pacemaker 14 for retrieving data from and/or transmitting data to pacemaker 14, including programmable parameters for controlling cardiac event sensing and therapy delivery.

External device telemetry unit 58 is configured for bidirectional communication with implantable telemetry circuitry included in pacemaker 14. Telemetry unit 58 includes a transceiver and antenna for establishing a wireless communication link 24 with pacemaker 14 and is configured to operate in conjunction with processor 52 for sending and receiving data relating to pacemaker functions via the communication link 24. Communication link 24 may be established using a radio frequency (RF) link such as BLUETOOTH®, Wi-Fi, Medical Implant Communication Service (MICS) or other communication bandwidth. In some examples, external device 20 may include a programming head that is placed proximate pacemaker 14 to establish and maintain a communication link 24, and in other examples external device 20 and pacemaker 14 may be configured to communicate using a distance telemetry algorithm and circuitry that does not require the use of a programming head and does not require user intervention to maintain a communication link.

It is contemplated that external device 20 may be in wired or wireless connection to a communications network via a telemetry circuit that includes a transceiver and antenna or via a hardwired communication line for transferring data to a centralized database or computer to allow remote management of the patient. Remote patient management systems including a centralized patient database may be configured to utilize the presently disclosed techniques to enable a clinician to review EGM, motion sensor signal, and marker channel data and authorize programming of sensing and therapy control parameters in pacemaker 14, e.g., after viewing a visual representation of EGM, motion sensor signal and marker channel data.

Figure 2:
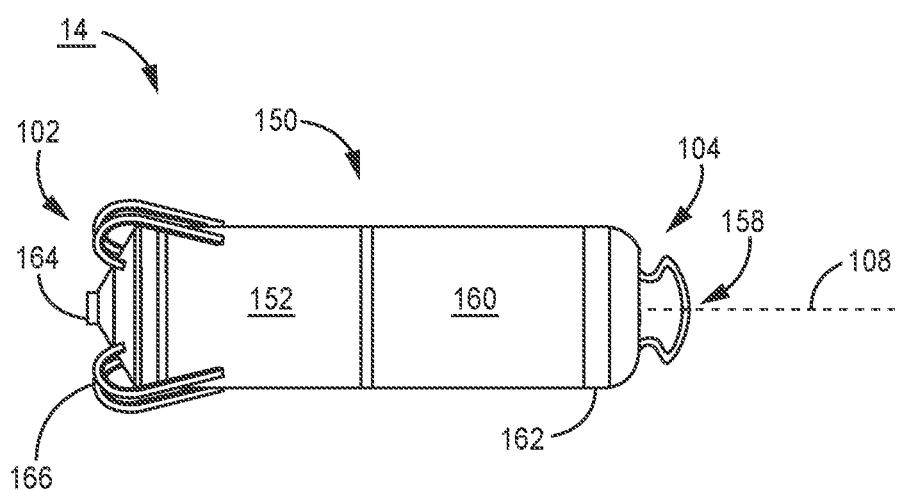
FIG. 2 is a conceptual diagram of the pacemaker shown in FIG. 1.

FIG. 2 is a conceptual diagram of the pacemaker 14 shown in FIG. 1. Pacemaker 14 includes electrodes 162 and 164 spaced apart along the housing 150 of pacemaker 14 for sensing cardiac electrical signals and delivering pacing pulses. Electrode 164 is shown as a tip electrode extending from a distal end 102 of pacemaker 14, and electrode 162 is shown as a ring electrode along a mid-portion of housing 150, for example adjacent housing proximal end 104. Distal end 102 is referred to as "distal" in that it is expected to be the leading end as pacemaker 14 is advanced through a delivery tool, such as a catheter, and placed against a targeted implant and pacing site.

Electrodes 162 and 164 form an anode and cathode pair for bipolar cardiac pacing and sensing. In alternative embodiments, pacemaker 14 may include two or more ring electrodes, two tip electrodes, and/or other types of electrodes exposed along pacemaker housing 150 for delivering electrical stimulation to heart 8 and sensing cardiac electrical signals. Electrodes 162 and 164 may be, without limitation, titanium, platinum, iridium or alloys thereof and may include a low polarizing coating, such as titanium nitride, iridium oxide, ruthenium oxide, platinum black, among others. Electrodes 162 and 164 may be positioned at locations along pacemaker 14 other than the locations shown.

Housing 150 is formed from a biocompatible material, such as a stainless steel or titanium alloy. In some examples, the housing 150 may include an insulating coating. Examples of insulating coatings include parylene, urethane, PEEK, or polyimide, among others. The entirety of the housing 150 may be insulated, but only electrodes 162 and 164 uninsulated. Electrode 164 may serve as a cathode electrode and be coupled to internal circuitry, e.g., a pacing pulse generator and cardiac electrical signal sensing circuitry, enclosed by housing 150 via an electrical feedthrough crossing housing 150. Electrode 164 may be a button electrode, hemispherical electrode, ring electrode, segmented electrode, helical electrode, fishhook electrode or other tissue-piercing electrode or other shape or configuration in various examples.

Electrode 162 may be formed as a conductive portion of housing 150 defining a ring electrode circumscribing a lateral sidewall of housing 150 that is electrically isolated from the other portions of the housing 150 as generally shown in FIG. 2. The lateral sidewall extends from proximal end 104 to distal end 102 of housing 150. In other examples, the entire periphery of the housing 150 may function as an electrode that is electrically isolated from tip electrode 164, instead of providing a localized ring electrode such as anode electrode 162. Electrode 162 formed along an electrically conductive portion of housing 150 may serve as a return anode during pacing and sensing with electrode 164 serving as the cathode electrode. Electrode 162 may alternatively circumscribe a portion of the lateral sidewall or be configured as a button, segmented or other type of electrode.

The housing 150 encloses a control electronics subassembly 152 and a battery subassembly 160, which provides power to the control electronics subassembly 152. Battery subassembly 160 may include one or more chargeable or non-rechargeable batteries for powering one or more processor(s), sensor(s), pulse generator, sensing circuit, and other circuitry of control electronics subassembly 152. Control electronics subassembly 152 houses the electronics for sensing cardiac signals, generating pacing pulses and controlling therapy delivery and other functions of pacemaker 14 as described below in conjunction with FIG. 3. A motion sensor may be implemented as an accelerometer enclosed within housing 150 in some examples. The accelerometer may provide the sensed acceleration signal to a processor included in control electronics subassembly 152 for signal processing and analysis for detecting atrial systolic events, e.g., for use in controlling the timing of ventricular pacing pulses, as described below.

The accelerometer may be a three-dimensional accelerometer. In some examples, the accelerometer may have one "longitudinal" axis that is parallel to or aligned with the longitudinal axis 108 of pacemaker 14 and two orthogonal axes that extend in radial directions relative to the longitudinal axis 108. Practice of the techniques disclosed herein, however, are not limited to a particular orientation of the accelerometer within or along housing 150. In other examples, a one-dimensional accelerometer may be used to sense a motion signal from which atrial systolic events are detected. In still other examples, a two dimensional accelerometer or other multi-dimensional accelerometer may be used. Each axis of a single or multi-dimensional accelerometer may be defined by a piezoelectric element, microelectrical mechanical system (MEMS) device or other sensor element capable of producing an electrical signal in response to changes in acceleration imparted on the sensor element, e.g., by converting the acceleration to a force or displacement that is converted to the electrical signal. In a multi-dimensional accelerometer, the sensor elements may be arranged orthogonally with each sensor element axis orthogonal relative to the other sensor element axes. Orthogonal arrangement of the elements of a multi-axis accelerometer, however, is not necessarily required.

Each sensor element may produce an acceleration signal corresponding to a vector aligned with the axis of the sensor element. Pacemaker 14 may be configured to select a vector signal of a multi-dimensional accelerometer (also referred to as a "multi-axis" accelerometer) for use in sensing atrial systolic events. In some cases one, two or all three axis signals produced by a three dimensional accelerometer may be selected as a vector signal for use in detecting atrial systolic events, e.g., for controlling atrial synchronized ventricular pacing delivered by pacemaker 14.

Pacemaker 14 may include a set of fixation tines 166 to secure pacemaker 14 to patient tissue, e.g., by actively engaging with the ventricular endocardium and/or interacting with the ventricular trabeculae. Fixation tines 166 are configured to anchor pacemaker 14 to position electrode 164 in operative proximity to a targeted tissue for delivering therapeutic electrical stimulation pulses. Numerous types of active and/or passive fixation members may be employed for anchoring or stabilizing pacemaker 14 in an implant position. It is to be understood that the size, shape, and locations of electrodes 162 and 164 and fixation tines 166, if present, may vary depending on the implant location of pacemaker 14 as needed for sensing cardiac signals and delivering ventricular pacing pulses to a target tissue. Pacemaker 14 may optionally include a delivery tool interface 158. Delivery tool interface 158 may be located at the proximal end 104 of pacemaker 14 and is configured to connect to a delivery device, such as a catheter, used to position pacemaker 14 at an implant location during an implantation procedure, for example within a heart chamber.

Figure 3:
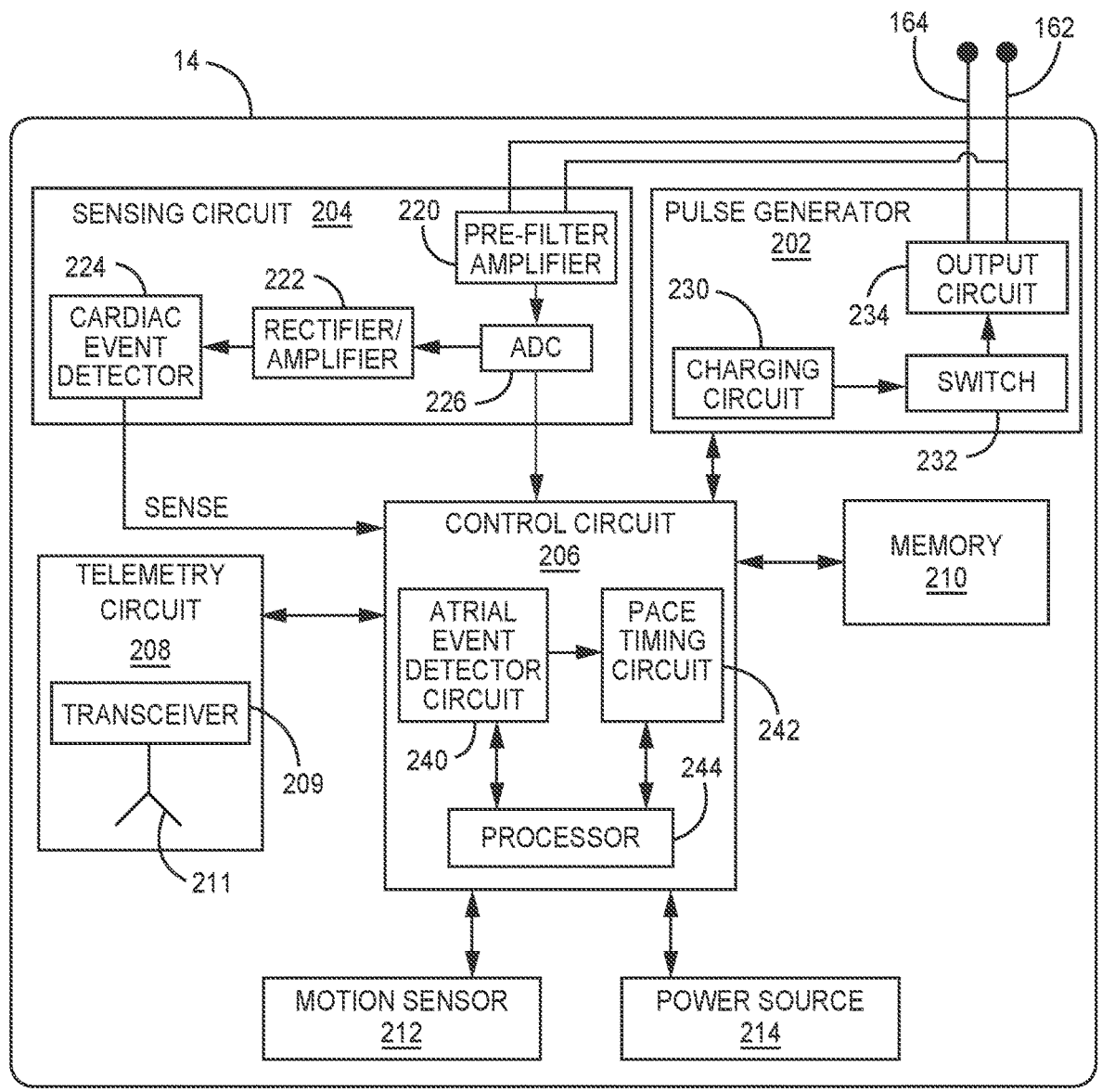
FIG. 3 is a conceptual diagram of an example configuration of the pacemaker shown in FIG. 1.

FIG. 3 is a conceptual diagram of an example configuration of pacemaker 14 shown in FIG. 1. Pacemaker 14 includes a pulse generator 202, a cardiac electrical signal sensing circuit 204, a control circuit 206, memory 210, telemetry circuit 208, motion sensor 212 and a power source 214. The various circuits represented in FIG. 3 may be combined on one or more integrated circuit boards which include a specific integrated circuit (ASIC), an electronic circuit, a processor (shared, dedicated, or group) and memory that execute one or more software or firmware programs, a combinational logic circuit, state machine or other suitable components that provide the described functionality.

Motion sensor 212 includes an accelerometer in the examples described herein. Motion sensor 212 is not limited to being an accelerometer, however, and other motion sensors may be utilized successfully in pacemaker 14 for detecting cardiac motion signals according to the techniques described herein. Examples of motion sensors that may be implemented in motion sensor 212 include piezoelectric sensors and MEMS devices. In other examples, a sensor capable of sensing a signal responsive to mechanical function, e.g., heart chamber contraction and relaxation, heart valve opening and closure, etc., may be included in motion sensor 212. Other examples of sensors that may be included in a pacemaker configured to perform the techniques disclosed herein for controlling a PVAB period include an impedance sensor and a pressure sensor, for instance. Pacemaker 14 may include an impedance measurement circuit for sensing an impedance signal from which atrial events signals may be detected in some examples. In other examples, pacemaker 14 may include a pressure sensor for sensing a pressure signal and detecting an atrial event signal from the pressure signal. In these examples, a PVAB period may be set following a ventricular event and adjusted based on heart rate and/or an amplitude of the signal determined during the PVAB period according to the techniques disclosed herein.

Motion sensor 212 may include a multi-axis accelerometer, e.g., a two-dimensional or three-dimensional accelerometer, with each axis providing an axis signal that may be analyzed individually or in combination for detecting cardiac mechanical events. Motion sensor 212 produces an electrical signal correlated to motion or vibration of sensor 212 (and pacemaker 14), e.g., when subjected to flowing blood and/or cardiac motion. The motion sensor 212 may include one or more filter, amplifier, rectifier, analog-to-digital converter (ADC) and/or other components for producing a motion signal that is passed to control circuit 206. For example, each vector signal produced by each individual axis of a multi-axis accelerometer, or one or more selected axis signals, may be filtered by a high pass filter, e.g., a 10 Hz high pass filter. The filtered signal may be digitized by an ADC and rectified for use by atrial event detector circuit 240 for detecting atrial systolic events. The high pass filter may be lowered (e.g., to 5 Hz) if needed to detect atrial signals that have lower frequency content. In some examples, high pass filtering is performed with no low pass filtering. In other examples, each accelerometer axis signal is filtered by a low pass filter, e.g., a 30 Hz low pass filter, with or without high pass filtering.

One example of an accelerometer for use in implantable medical devices that may be implemented in conjunction with the techniques disclosed herein is generally disclosed in U.S. Pat. No. 5,885,471 (Ruben, et al.), incorporated herein by reference in its entirety. An implantable medical device arrangement including a piezoelectric accelerometer for detecting patient motion is disclosed, for example, in U.S. Pat. No. 4,485,813 (Anderson, et al.) and U.S. Pat. No. 5,052,388 (Sivula, et al.), both of which patents are hereby incorporated by reference herein in their entirety. Examples of three-dimensional accelerometers that may be implemented in pacemaker 14 and used for detecting cardiac mechanical events using the presently disclosed techniques are generally described in U.S. Pat. No. 5,593,431 (Sheldon) and U.S. Pat. No. 6,044,297 (Sheldon), both of which are incorporated herein by reference in their entirety. Other accelerometer designs may be used for producing an electrical signal that is correlated to motion, e.g., acceleration, imparted on pacemaker 14 due to ventricular and atrial events.

Cardiac electrical signal sensing circuit 204, also referred to herein as "sensing circuit" 204, is configured to receive a cardiac electrical signal via electrodes 162 and 164 by a pre-filter and amplifier circuit 220. Pre-filter and amplifier circuit may include a high pass filter to remove DC offset, e.g., a 2.5 to 5 Hz high pass filter, or a wideband filter having a passband of 2.5 Hz to 100 Hz to remove DC offset and high frequency noise. Pre-filter and amplifier circuit 220 may further include an amplifier to amplify the "raw" cardiac electrical signal passed to analog-to-digital converter (ADC) 226. ADC 226 may pass a multi-bit, digital EGM signal to control circuit 206 for performing morphology analysis of the EGM signal, storing EGM signal segments in memory 210 for transmission to an external device or other processing and analysis. For example, the EGM signal may be received by atrial event detector circuit 240 for use in identifying ventricular electrical events (e.g., R-waves or T-waves) and/or atrial electrical events, e.g., P-waves. Identification of cardiac electrical events may be used in algorithms for establishing atrial sensing control parameters and for detecting atrial systolic events from the motion sensor signal. The digital signal from ADC 226 may be passed to rectifier and amplifier circuit 222, which may include a rectifier, bandpass filter, and amplifier for passing a cardiac signal to cardiac event detector 224.

Cardiac event detector 224 may include a sense amplifier or other detection circuitry that compares the incoming rectified, cardiac electrical signal to an R-wave sensing threshold, which may be an auto-adjusting threshold, for sensing intrinsic R-waves attendant to intrinsic ventricular myocardial depolarizations. When the incoming signal crosses the R-wave sensing threshold, the cardiac event detector 224 senses a ventricular event and produces a ventricular sensed event signal that is passed to control circuit 206. In other examples, cardiac event detector 224 may receive the digital output of ADC 226 for detecting R-waves by a comparator, morphological signal analysis of the digital EGM signal or other R-wave detection techniques. Processor 244 of control circuit 206 may provide sensing control signals to sensing circuit 204, e.g., for controlling the R-wave sensing threshold including the R-wave sensing sensitivity, and various blanking and refractory intervals that may be applied to the cardiac electrical signal for controlling R-wave sensing.

Ventricular sensed event signals passed from cardiac event detector 224 to control circuit 206 may be used for scheduling ventricular pacing pulses by pace timing circuit 242 and for use in identifying the timing of ventricular electrical events. For example, ventricular event intervals (RRIs), sometimes referred to as VV intervals (or "VVIs" but not to be confused with a VVI pacing mode), may be determined by control circuit 206 as time intervals between consecutively received ventricular sensed event signals. The RRIs (or corresponding heart rate) may be determined and used in setting or adjusting a PVAB period according to techniques disclosed herein.

In some examples, sensing circuit 204 may include multiple sensing channels including a ventricular sensing channel for sensing R-waves by cardiac event detector 224 and an atrial sensing channel for sensing P-waves attendant to atrial myocardial depolarization, for example, by cardiac event detector 224. In these examples, cardiac event detector 224 may generate both ventricular sensed event signals and atrial sensed event signals that may be passed to control circuit 206 for use in controlling atrial synchronized ventricular pacing pulse timing. The atrial event signals may be sensed from a cardiac electrical signal sensed by the same electrodes 162 and 164 but may undergo different filtering, amplification, and blanking than the cardiac electrical signal that the R-waves are sensed from. Cardiac event detector 224 may include a sense amplifier, comparator or other detection circuitry configured for sensing an atrial P-wave in response to a P-wave sensing threshold crossing by the cardiac electrical signal. The illustrative examples presented herein for controlling a PVAB period for inhibiting sensing of an atrial event signal from a motion signal following a ventricular event may be adapted for use in controlling a PVAB period applied to the cardiac electrical signal in some examples. The PVAB period may be started in response to an identified ventricular event, e.g., a ventricular pacing pulse or ventricular sensed event signal from sensing circuit 204. Atrial P-wave sensing by sensing circuit 204 may be inhibited during the PVAB period. The PVAB period may be adjusted based on an analysis of the cardiac electrical signal amplitude during the PVAB period according to the techniques disclosed herein.

Control circuit 206 may include an atrial event detector circuit 240, pace timing circuit 242, and processor 244. Control circuit 206 may receive ventricular sensed event signals and/or digital cardiac electrical signals from sensing circuit 204 for use in detecting and confirming cardiac events and controlling ventricular pacing. For example, ventricular sensed event signals may be passed to pace timing circuit 242 for inhibiting scheduled ventricular pacing pulses or scheduling ventricular pacing pulses by starting a pacing escape interval when pacemaker 14 is operating in a non-atrial tracking ventricular pacing mode. Ventricular sensed event signals may be passed to atrial event detector circuit 240 for use in setting the PVAB period and, in some examples, a refractory period and/or one or more time windows used by control circuit 206 in sensing atrial event signals from the motion sensor signal.

Atrial event detector circuit 240 is configured to detect atrial event signals from the motion signal received from motion sensor 212. Techniques for detecting atrial event signals are described below, e.g., in conjunction with FIG. 5. In some examples, one or more ventricular mechanical event signals may be detected from the motion sensor signal in a given cardiac cycle to facilitate positive detection of the atrial event signal from the motion sensor signal during the ventricular cycle. As disclosed herein, control circuit 206 may be configured to determine an amplitude of the motion sensor signal, which may correspond to the amplitude or relative timing of a ventricular event signal in the motion signal, for use in setting or adjusting the duration of the PVAB period.

Atrial event detector circuit 240 receives a motion signal from motion sensor 212 and may start the PVAB period in response to a ventricular electrical event. The ventricular electrical event may be a ventricular event sensed by sensing circuit 204, which may be identified by control circuit 206 based on a ventricular sensed event signal received from sensing circuit 204 corresponding to an intrinsic R-wave sensed by sensing circuit 204. The ventricular electrical event may be the delivery of a ventricular pacing pulse by pulse generator 202. The PVAB period may extend for a time period after the ventricular electrical event during which ventricular mechanical events, e.g., ventricular contraction followed by closure of the aortic and pulmonic valves, marking the approximate offset or end of ventricular mechanical systole, are expected to occur. When ventricular pacing is properly synchronized to atrial events, an atrial event signal is not expected to occur during the PVAB period, generally corresponding to ventricular systole. Motion signal peaks that may occur during the PVAB period, therefore, are not sensed as atrial event signals by atrial event detector circuit 240.

The motion sensor signal, however, may still be sensed during all or a portion of the PVAB period in some examples. Control circuit 206 may receive the motion sensor signal during the PVAB period during at least some ventricular cycles for processing and analysis for use in setting or adjusting the PVAB period. As described below, an amplitude of the motion sensor signal may be determined during the PVAB period, which may be a maximum peak amplitude or a predetermined amplitude threshold crossing. In some examples, an associated time of the determined amplitude, e.g., a maximum peak amplitude time and/or a latest time of a predetermined amplitude threshold crossing during the PVAB period, may be determined for use setting or adjusting the PVAB period.

Atrial event detector circuit 240 determines if the motion sensor signal satisfies atrial systolic event detection criteria outside of the PVAB period. Atrial event detector circuit 240 may set time windows corresponding to the passive ventricular filling phase and the active ventricular filling phase of the ventricular cycle based on the timing of a preceding ventricular electrical event, either a ventricular sensed event signal received from sensing circuit 204 or a ventricular pacing pulse delivered by pulse generator 202. A motion sensor signal crossing of an atrial event sensing threshold during either of these windows may be detected as the atrial event. As described below, two different atrial event sensing threshold values may be established for applying a first, higher threshold value during the passive filling phase window (also referred to herein as an "A3 window") and a second, lower threshold value after the passive filling phase window (e.g., during an active filling phase window also referred to below as an "A4 window"). The earliest crossing of the atrial event sensing threshold by the motion signal may be detected as the atrial event signal by atrial event detector circuit 240.

Atrial event detector circuit 240 may pass an atrial event detection signal to processor 244 and/or pace timing circuit 242 in response to sensing an atrial event signal. Pace timing circuit 242 (or processor 244) may additionally receive ventricular sensed event signals from cardiac event detector 224 for use in controlling the timing of pacing pulses delivered by pulse generator 202. Processor 244 may include one or more clocks for generating clock signals that are used by pace timing circuit 242 to time out an AV pacing interval that is started upon receipt of an atrial event detection signal from atrial event detector circuit 240. Pace timing circuit 242 may include one or more pacing escape interval timers or counters that are used to time out the AV pacing interval, which may be a programmable interval stored in memory 210 and retrieved by processor 244 for use in setting the AV pacing interval used by pace timing circuit 242.

Pace timing circuit 242 may additionally include a lower pacing rate interval timer for controlling a minimum ventricular pacing rate. For example, if an atrial event signal is not sensed from the motion sensor signal that triggers a ventricular pacing pulse at the programmed AV pacing interval, a ventricular pacing pulse may be delivered by pulse generator 202 upon expiration of the lower pacing rate interval to prevent ventricular asystole and maintain a minimum ventricular rate. The lower pacing rate interval may be adjusted to a rate smoothing interval based on recent RRIs to avoid a sudden change in the ventricular rate. At times, control circuit 206 may control pulse generator 202 in a non-atrial tracking ventricular pacing mode (also referred to as "asynchronous ventricular pacing"), e.g., when the atrial rate is greater than an upper tracking rate limit, during rate response pacing, or during various processes that control circuit 206 may perform for establishing sensing control parameters used for sensing atrial event signals from the motion signal.

In some instances, pacemaker 14 may operate in a non-atrial tracking ventricular pacing mode with dual chamber sensing, which may be denoted as a VDI pacing mode, in which ventricular pacing pulses are delivered in the absence of a sensed R-wave and inhibited in response to a ventricular sensed event signal from sensing circuit 204. Dual chamber sensing may be performed during the non-atrial tracking ventricular pacing mode by sensing ventricular electrical events by sensing circuit 204 and sensing atrial event signals from the motion signal received by atrial event detector circuit 240 from motion sensor 212. Some atrial event sensing parameters may be established during the VDI pacing mode, which may include an atrial event sensing vector of the motion sensor for producing the motion signal from which the atrial event signals are sensed, the end of the passive ventricular filling window, and the atrial event sensing threshold amplitude values applied during and after the passive ventricular filling window. Techniques for establishing and adjusting atrial event sensing control parameters are generally disclosed in U.S. Pat. No. 10,449,366 (Splett, et al.), U.S. Publication No. 2021/0236825 (Sheldon, et al.), and U.S. Publication No. 2021/0236826 (Sheldon, et al.), all of which are incorporated herein by reference in their entirety.

Pulse generator 202 generates electrical pacing pulses that are delivered to the patient's heart via cathode electrode 164 and return anode electrode 162. In addition to providing control signals to pace timing circuit 242 and pulse generator 202 for controlling the timing of ventricular pacing pulses, processor 244 may retrieve programmable pacing control parameters from memory 210, such as pacing pulse amplitude and pacing pulse width, which are passed to pulse generator 202 for controlling pacing pulse delivery.

Pulse generator 202 may include charging circuit 230, switching circuit 232 and an output circuit 234. Charging circuit 230 may include a holding capacitor that may be charged to a pacing pulse amplitude by a multiple of the battery voltage signal of power source 214 under the control of a voltage regulator. The pacing pulse amplitude may be set based on a control signal from control circuit 206. Switching circuit 232 may control when the holding capacitor of charging circuit 230 is coupled to the output circuit 234 for delivering the pacing pulse. For example, switching circuit 232 may include a switch that is activated by a timing signal received from pace timing circuit 242 upon expiration of an AV pacing interval (or lower rate pacing interval) and kept closed for a programmed pacing pulse width to enable discharging of the holding capacitor of charging circuit 230. The holding capacitor, previously charged to the pacing pulse voltage amplitude, is discharged across electrodes 162 and 164 through the output capacitor of output circuit 234 for the programmed pacing pulse duration. Examples of pacing circuitry generally disclosed in U.S. Pat. No. 5,507,782 (Kieval, et al.) and in U.S. Pat. No. 8,532,785 (Crutchfield, et al.), both of which patents are incorporated herein by reference in their entirety, may be implemented in pacemaker 14 for charging a pacing capacitor to a predetermined pacing pulse amplitude under the control of control circuit 206 and delivering a pacing pulse.

Memory 210 may include computer-readable instructions that, when executed by control circuit 206, cause control circuit 206 to perform various functions attributed throughout this disclosure to pacemaker 14. The computer-readable instructions may be encoded within memory 210. Memory 210 may include any non-transitory, computer-readable storage media including any volatile, non-volatile, magnetic, optical, or electrical media, such as a random access memory (RAM), read-only memory (ROM), non-volatile RAM (NVRAM), electrically-erasable programmable ROM (EEPROM), flash memory, or other digital media with the sole exception being a transitory propagating signal. Memory 210 may store timing intervals and other data used by control circuit 206 to control the delivery of pacing pulses by pulse generator 202, e.g., by setting PVAB periods according to the techniques disclosed herein, sensing atrial event signals by atrial event detector circuit 240 from the motion sensor signal outside of the PVAB periods, and setting a pacing escape interval timer included in pace timing circuit 242 to an AV pacing interval in response to sensed atrial event signals.

Power source 214 provides power to each of the other circuits and components of pacemaker 14 as required. Power source 214 may include one or more energy storage devices, such as one or more rechargeable or non-rechargeable batteries. The connections between power source 214 and other pacemaker circuits and components are not shown in FIG. 3 for the sake of clarity but are to be understood from the general block diagram of FIG. 3. For example, power source 214 may provide power as needed to charging and switching circuitry included in pulse generator 202, amplifiers, ADC 226 and other components of sensing circuit 204, telemetry circuit 208, memory 210, and motion sensor 212. Power source 214 may correspond to battery subassembly 160 shown in FIG. 2.

Telemetry circuit 208 includes a transceiver 209 and antenna 211 for transferring and receiving data via a radio frequency (RF) communication link. Telemetry circuit 208 may be capable of bi-directional communication with external device 20 (FIG. 1) as described above. Motion sensor signals and cardiac electrical signals, and/or data derived therefrom may be transmitted by telemetry circuit 208 to external device 20. Programmable control parameters and algorithms for performing atrial event sensing and ventricular pacing control may be received by telemetry circuit 208 and stored in memory 210 for access by control circuit 206.

The functions attributed to pacemaker 14 herein may be embodied as one or more processors, controllers, hardware, firmware, software, or any combination thereof. Depiction of different features as specific circuitry is intended to highlight different functional aspects and does not necessarily imply that such functions must be realized by separate hardware, firmware or software components or by any particular circuit architecture. Rather, functionality associated with one or more circuits described herein may be performed by separate hardware, firmware or software components, or integrated within common hardware, firmware or software components. For example, sensing atrial event signals from the motion sensor signal and ventricular pacing control operations performed by pacemaker 14 may be implemented in control circuit 206 in hardware, firmware and/or software executing instructions stored in memory 210 and relying on input from sensing circuit 204 and motion sensor 212. Providing software, hardware, and/or firmware to accomplish the described functionality in the context of any modern pacemaker, given the disclosure herein, is within the abilities of one of skill in the art.

Figure 4:
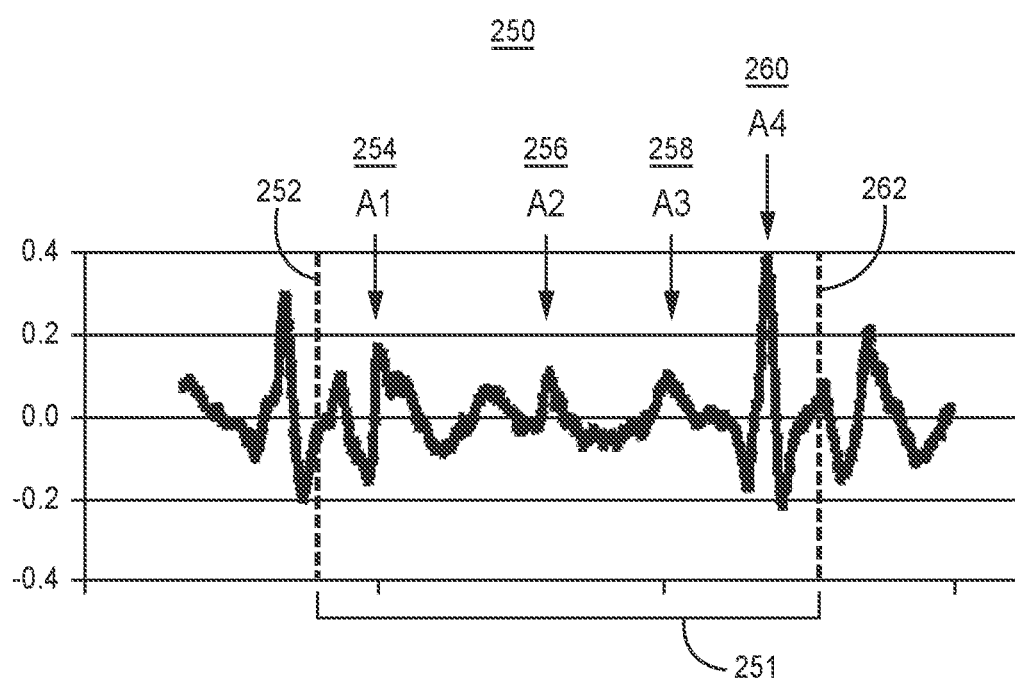
FIG. 4 is an example of a motion sensor signal that may be acquired by a motion sensor included in the pacemaker of FIG. 1 over a cardiac cycle.

FIG. 4 is an example of a motion sensor signal 250 that may be acquired by motion sensor 212 over a cardiac cycle. Vertical dashed lines 252 and 262 denote the timing of two consecutive ventricular events (an intrinsic ventricular depolarization or a ventricular pacing pulse), marking the respective beginning and end of the ventricular cycle 251. The motion signal includes an A1 event 254, an A2 event 256, an A3 event 258 and an A4 event 260. The A1 event 254 is an acceleration signal (in this example when motion sensor 212 is implemented as an accelerometer) that occurs during ventricular contraction and marks the approximate onset of ventricular mechanical systole. The A1 event is also referred to herein as a "ventricular contraction event." The A2 event 256 is an acceleration signal that may occur with closure of the aortic and pulmonic valves, marking the approximate offset or end of ventricular mechanical systole. The A3 event 258 is an acceleration signal that occurs during passive ventricular filling and marks ventricular mechanical diastole. The A3 event is also referred to herein as the "ventricular passive filling event." The A1 through A3 events are ventricular events associated with ventricular myocardial contraction and relaxation.

The A4 event 260 is an acceleration signal that occurs during atrial contraction and active ventricular filling and marks atrial mechanical systole. The A4 event 260 is also referred to herein as the "atrial event signal" that is sensed or detected from motion sensor signal 250. With reference to FIG. 3, atrial event detector circuit 240 may be configured to detect the A4 event 260 from the motion signal 250 received from motion sensor 212. Processor 244 may control pace timing circuit 242 to trigger a ventricular pacing pulse by starting an AV pacing interval in response to detecting the A4 event 260.

Figure 5:
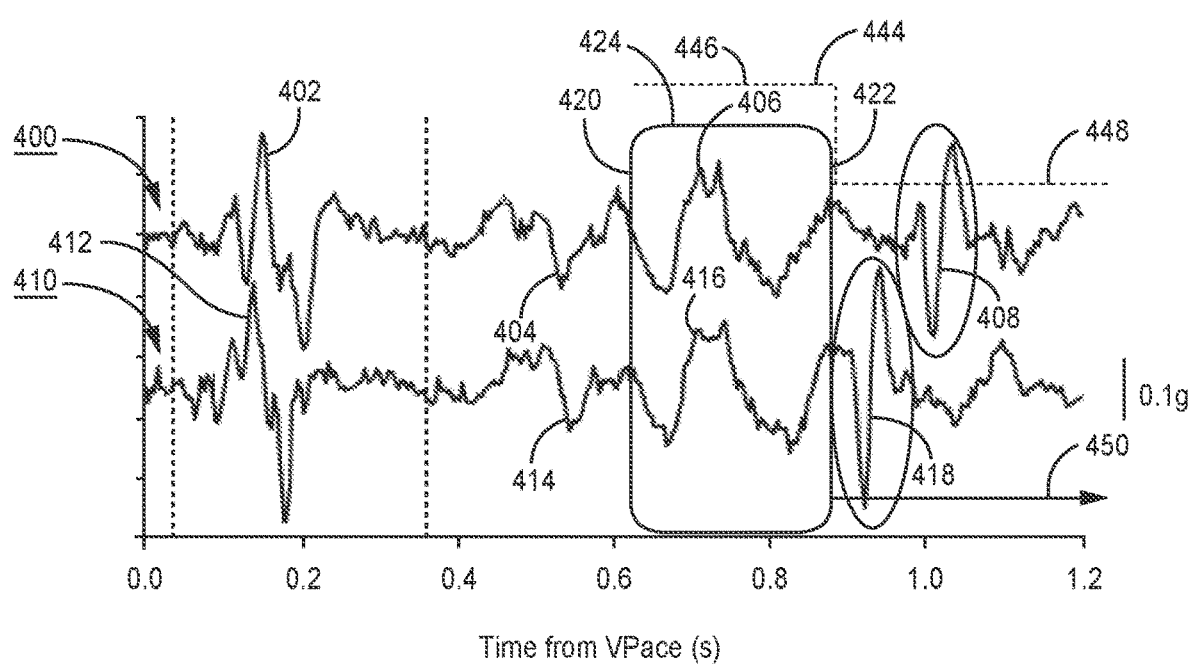
FIG. 5 is an example of motion sensor signals acquired over two different cardiac cycles.

FIG. 5 is an example of motion sensor signals 400 and 410 acquired over two different cardiac cycles. A ventricular pacing pulse is delivered at time 0.0 seconds for both cardiac cycles. The top sensor signal 400 is received over one cardiac cycle, and the bottom sensor signal 410 is received over a different cardiac cycle. The two signals 400 and 410 are aligned in time at 0.0 seconds, the time of the ventricular pacing pulse delivery. While motion signals 400 and 410 and motion signal 250 of FIG. 4 are shown as raw accelerometer signals, it is recognized that control circuit 206 may receive a digitized filtered, amplified and rectified signal from motion sensor 212 for processing and analysis.

The A1 events 402 and 412 of the respective motion sensor signals 400 and 410, which occur during ventricular contraction, are observed to be well-aligned in time following the ventricular pacing pulse at time 0.0 seconds. Similarly, the A2 events 404 and 414 (which may mark the end of ventricular systole) and the A3 events 406 and 416 (occurring during passive ventricular filling) are well-aligned in time. Because the A1, A2 and A3 events are ventricular events, occurring during ventricular contraction, at the end of ventricular systole and during passive ventricular filling, respectively, these events are expected to occur at relatively consistent intervals relative to each other following a ventricular electrical event. The time relationship of the A1, A2 and A3 events may be different following a ventricular pacing pulse compared to following a sensed intrinsic R-wave; however, during a stable paced or intrinsic ventricular rhythm, the relative timing of ventricular A1, A2 and A3 events to each other and the immediately preceding ventricular electrical event is expected to be consistent from beat-to-beat.

The A4 events 408 and 418 of the first and second motion sensor signals 400 and 410 respectively are not aligned in time. The A4 event occurs during atrial systole and as such the time interval of the A4 event following the immediately preceding ventricular electrical event (sensed R-wave or ventricular pacing pulse) and the preceding A1 through A3 events may vary between cardiac cycles as changes in the atrial rate occur or when the ventricles are paced asynchronously with the atrial events.

A PVAB period 436 may be set to inhibit sensing of the A4 event following the ventricular electrical event (at time 0.0) to avoid sensing the A1 and A2 signals and promote reliably sensing of A4 events 408 and 418. The PVAB period 436 may be set to extend through an estimated onset of ventricular diastole, e.g., at least past an expected time of the A2 event 404 and 414, so that the PVAB period 436 includes both the A1 and A2 events. The A2 events 404 and 414 are shown as negative-going peaks in this non-rectified signal, but in a rectified signal that is compared to an A4 sensing threshold the A2 events 404 and 414 may have a large enough amplitude to be falsely sensed as the A4 event if the PVAB period 436 is too short.

During the PVAB period 436, the motion sensor 212 may be powered down and/or processing of the motion signal by motion sensor 212 and/or control circuit 206 may be disabled. Control circuit 206 may disable sensing and/or processing of the motion signal during the PVAB period 436 to conserve power source 214 (shown in FIG. 4). For example, control circuit 206 may disable motion sensor 212 or at least one axis of motion sensor 212, e.g., by disabling or reducing power supplied to the motion sensor 212 (or at least one motion sensor axis) from power source 214, at the onset of the PVAB period 436. Control circuit 206 may enable motion sensor 212, e.g., by providing power from power source 214 to power up motion sensor 212, at or just prior to (e.g., 10 to 20 milliseconds prior to) the expiration of the PVAB period 436 so that the motion signal is available for sensing atrial event signals after the expiration of the PVAB period 436.

In the example shown in FIG. 5, motion signal sensing is disabled for a power conservation time period 435 for conserving power source 214. Power conservation time period 435 may begin upon the ventricular event that caused control circuit 206 to start the PVAB period 436 and may be terminated prior to the expiration of PVAB period 436. At time point 437, at the expiration of time period 435, control circuit 206 may power up the motion sensor 212 so that by the expiration of the PVAB period 436, the motion signal 400 or 410 is available for sensing the A4 events 408 and 418 any time after the PVAB period 436. Because an inherent delay may exist between applying power to the motion sensor 212 and receiving of the motion signal by control circuit 206, the power conservation time period 435 may be terminated earlier, e.g., 10 to 100 milliseconds (ms) earlier, or 80 to 90 ms earlier as an example, than the expiration of the PVAB period 436. In other examples, the motion signal may be received by control circuit 206 during the power conservation time period 435, but control circuit 206 may disable processing and analysis of the motion signal until the expiration of the power conservation time period 435. In this case, the power conservation time period 435 may expire simultaneously with the PVAB period 436. During a telemetry session with external device 20, the power conservation time period 435 may be disabled to enable transmission of the motion signal to external device 20 for display to a user without interruption or discontinuities.

An A3 window 424 may be set as a time interval having a starting time 420 corresponding to the end of the PVAB period 436. A3 window 424 expires at an ending time 422. The ending time 422 may be considered a starting time of an A4 sensing window 450, though A4 events may be sensed during the A3 window in some instances. Because the timing of atrial systole may vary between ventricular cycles, the A4 event may sometimes occur earlier in the ventricular cycle, such that the atrial kick may occur during the passive ventricular filling phase, corresponding to the A3 window. A4 events may be sensed during the A3 window using a higher A4 sensing threshold amplitude 444 applied during the A3 window than after the A3 window ending time.

A4 events 408 and 418 may be detected based on a multi-level A4 sensing threshold 444. As seen by the lower motion sensor signal 410, the A4 event 418 may occur earlier after the A3 window 424 due to changes in atrial rate. In some instances, as the atrial rate increases, the A4 event 418 may occur within the A3 window 424. When this occurs, the A3 event 416 and the A4 event 418 may fuse as passive and active ventricular filling occur together. The fused A3/A4 event may have a high amplitude, even greater than the amplitude of either the A3 event 416 or the A4 event 418 when they occur separately. As such, in some examples a first, higher A4 sensing threshold amplitude 446 may be established for detecting an early A4 signal that is fused with the A3 signal during the A3 window 424. A second, lower A4 sensing threshold amplitude 448 may be established for detecting relatively later A4 signals, after the ending time 422 of the A3 window 424, during an A4 window 450. The A4 window 450 may extend from the ending time 422 of the A3 window 424 until an atrial event is sensed or until the next ventricular electrical event, sensed or paced. The earliest crossing of the A4 sensing threshold 444 by the motion sensor signal after the starting time 420 of the A3 window (or after the expiration of the PVAB period 436) may be sensed as the atrial event signal. Example techniques for establishing the A3 window ending time 422, an early A4 sensing threshold amplitude 446 used during the A3 window 424 and a late A4 sensing threshold amplitude 448 used during the A4 window 450 are generally described in the above-incorporated U.S. Pat. No. 10,449,366 (Splett, et al.), U.S. Publication No. 2021/0236825 (Sheldon, et al.), and U.S. Publication No. 2021/0236826 (Sheldon, et al.).

As the heart rate increases, the time from the ventricular electrical event to the end of ventricular systole may decrease such that the time from the ventricular electrical event, e.g., a pacing pulse or a sensed R-wave, to the A2 signal 404 or 414 and to the A3 signal 406 or 416 may shorten. The A4 events may also occur earlier after a ventricular electrical event as the ventricular rate increases when the ventricular rate is properly tracking the atrial rate. The PVAB period 436 may be appropriately shortened when the heart rate increases so that the A3 window 420 may start earlier following a ventricular electrical event. When the heart rate decreases, the PVAB period 436 may need to be increased, to extend through the A2 event 404 or 414, so that the A3 window 420 is not started before or during the A2 event 404 or 414. Using the techniques disclosed herein, the PVAB period 436 may be adjusted between two or more predetermined time periods as the ventricular rate increases and decreases. The PVAB period 436 may be adjusted between a minimum and a maximum PVAB period in a step change when the heart rate crosses a threshold rate in some examples. In other examples, the PVAB period 436 may be adjusted in a more linear manner between a minimum and maximum PVAB period as heart rate increases and decreases. Control circuit 206 may control the adjustment of the PVAB period 436 based on an analysis of the motion signal amplitude during the blanking period 436 in some examples.

Figure 6:
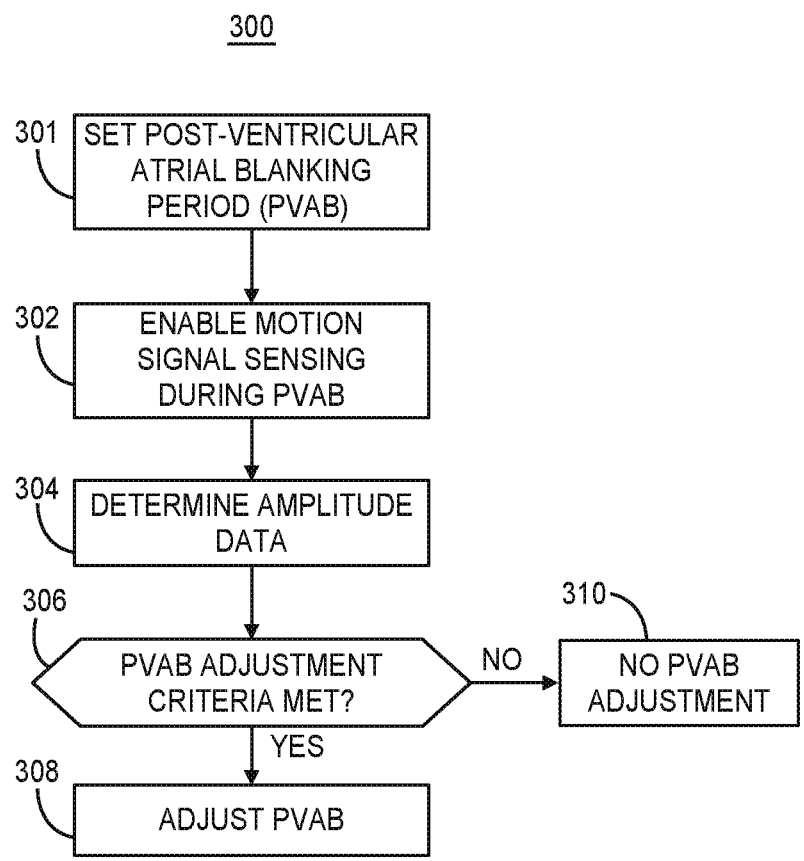
FIG. 6 is a flow chart of a method for adjusting a PVAB period according to one example.

FIG. 6 is a flow chart 300 of a method for adjusting the PVAB period according to one example. At block 301, control circuit 206 sets a PVAB period that is started in response to each ventricular electrical event. Control circuit 206 may identify ventricular electrical events by identifying ventricular sensed event signals (e.g., R-waves) sensed by sensing circuit 204 and/or by identifying ventricular pacing pulses generated by pulse generator 202. Control circuit 206 may set the PVAB period in response to each identified ventricular event. The PVAB period may extend 400 ms to 600 ms or 500 to 550 ms after the ventricular electrical event, as examples. It is recognized that the PVAB period that is set post-sense and the PVAB period that is set post-pace may be different due to different relative timings of the A2 and A3 event signals following the time of a ventricular sensed event signal compared to the relative timings of the A2 and A3 event signals following the time of a delivered ventricular pacing pulse.

At block 302, control circuit 206 may enable sensing of the motion signal during at least a portion of the PVAB period. As described above in conjunction with FIG. 5, during a ventricular pacing mode that includes atrial event sensing, the motion sensor or processing of the motion signal may be disabled during a power conservation time period that may extend for all or a portion of the PVAB period. Before adjusting the PVAB period, however, control circuit 206 may enable motion signal sensing and analysis at block 302 during the PVAB period for at least one or more PVAB periods. Motion signal sensing and analysis may be enabled for the entirety of the PVAB period or for at least a latest portion of the PVAB period. For example, motion signal sensing and analysis may be enabled for the latest 100 ms, the latest 200 ms, the latest 300 ms or other selected portion of the PVAB period.

While motion signal sensing is enabled during the PVAB period, atrial event signal sensing may not be enabled during the PVAB period at block 302. Control circuit 206 may set the A4 sensing threshold amplitude to a maximum amplitude to inhibit A4 event sensing during the PVAB period when motion signal sensing and analysis is enabled during the PVAB for use in adjusting the PVAB period. Alternatively, if the motion signal crosses an A4 sensing threshold amplitude during the PVAB period, control circuit 206 may detect the threshold crossing but be configured to withhold starting an AV pacing interval by ignoring any atrial event detected by atrial event detector circuit 240 during the PVAB period.

At block 304, control circuit 206 may determine motion signal amplitude data during the PVAB period during one or more ventricular cycles. When separate post-sense and post-pace PVAB periods are set by control circuit 206, the amplitude data determined at block 304 for multiple ventricular cycles may be separated into post-sense amplitude data and post-pace amplitude data, which may be stored in memory buffers allocated for storing amplitude data.

The amplitude data may be determined during a latest portion of the PVAB period, e.g., the latest 50 to 300 ms of the PVAB period in some examples. The amplitude data may include an absolute maximum peak amplitude of the motion signal, a time of the absolute maximum peak amplitude, whether an amplitude threshold crossing occurs during the PVAB period, the time of an amplitude threshold crossing, and/or whether the motion signal amplitude is greater than or equal to an amplitude threshold during a latest portion of a PVAB period. When control circuit 206 determines the motion signal amplitude data during each PVAB period of multiple ventricular cycles, control circuit 206 may determine an average, median, maximum, minimum or other representative value(s) of the determined amplitudes and/or associated times of a peak amplitude or amplitude threshold crossing relative to the time of the preceding ventricular electrical event and/or relative to the expiration of the PVAB period. The representative value(s) may be determined for use in adjusting the PVAB period.

Figure 7:
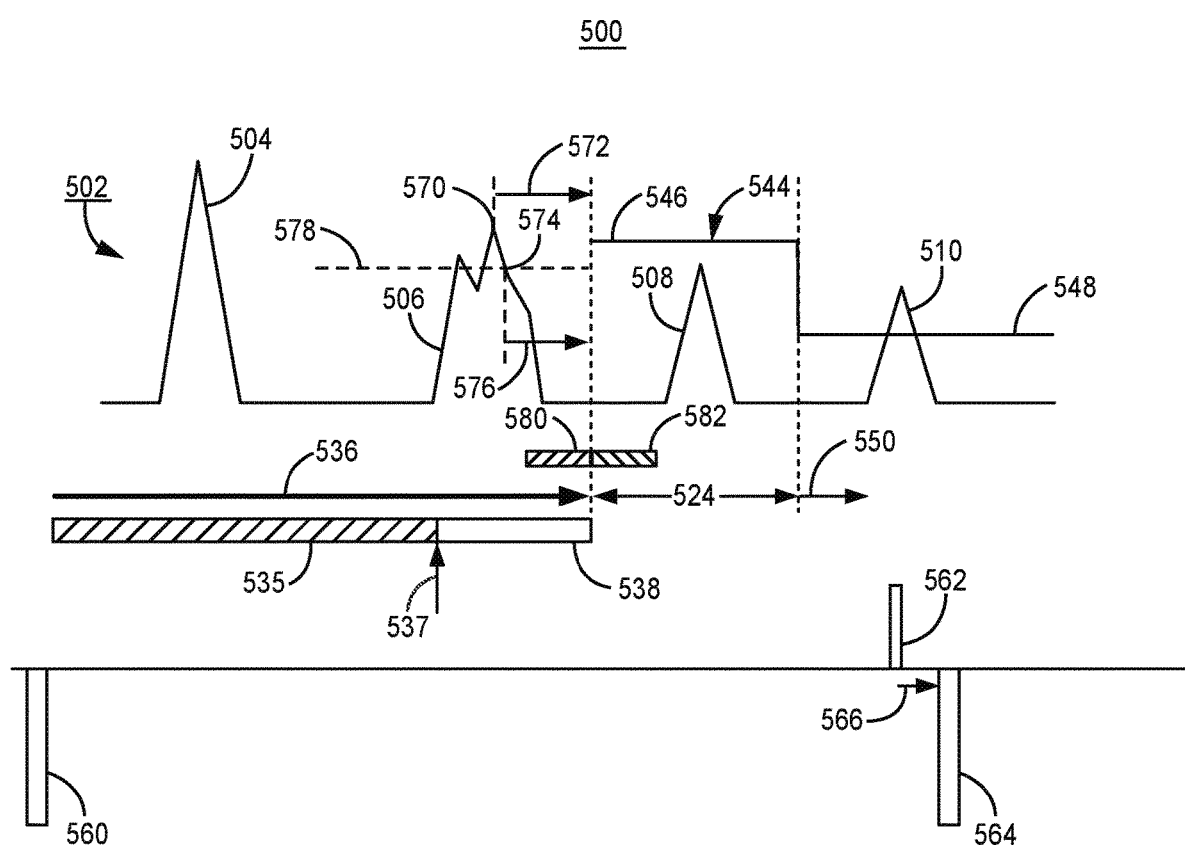
FIG. 7 is a conceptual diagram of a motion signal illustrating amplitude data that may be determined by the pacemaker of FIG. 1 during the PVAB period according to some examples.

FIG. 7 is a conceptual diagram 500 of a motion signal 502 illustrating techniques for determining amplitude data by control circuit 206 during the PVAB period of one ventricular cycle according to some examples. Motion signal 502 includes an A1 event 504, an A2 event 506, an A3 event 508 and an A4 event 510. Following a ventricular pacing pulse 560, the PVAB period 536 is started. A passive ventricular filling window (A3 window) 524 begins upon expiration of the PVAB period 536. A first, higher A4 sensing threshold amplitude 546 is applied to the motion signal 502 during the A3 window 524. The A4 sensing threshold 544 is decreased to the second, lower A4 sensing threshold amplitude 548 after expiration of the A3 window 524, during an A4 sensing window 550 that may extend until the A4 event 510 is sensed or until a ventricular pacing pulse is delivered or a ventricular event signal is sensed by the sensing circuit 204.

In the example shown, the A4 event 510 is sensed upon a crossing of the second, lower A4 sensing threshold amplitude 548 by motion signal 502. Control circuit 206 sets an AV pacing interval 566 in response to an atrial event detection signal 562 generated by atrial event detector circuit 240. Pulse generator 202 generates a ventricular pacing pulse 564 at the expiration of the AV pacing interval 566.

As described above, the sensing and analysis of the motion signal 502 may be disabled during a power conservation time period 535, which may extend until or just prior to the expiration of the PVAB period 536 to enable powering up of the motion sensor so that processing and analysis of the motion signal 502 can begin upon expiration of the PVAB period 536. When control circuit 206 is determining whether to adjust the PVAB period 536, however, the power conservation time period 535 may shortened or cancelled altogether so that the motion signal 502 can be received at least during a latest portion 538 of the PVAB period 536 by control circuit 206 for processing and analysis. In the example shown, the motion sensor may be powered up during the PVAB period 536 so that processing and analysis of the motion signal 502 for determining amplitude data may be begin at time point 537. The later portion 538 of the PVAB period 536 may be the latest 50 ms, 100 ms, 200 ms, 300 ms or other predetermined portion or percentage of PVAB period 536. The later portion 538 of the PVAB period 536 is also referred to herein as an "amplitude analysis window" because control circuit 206 may determine the motion signal amplitude data at block 304 of FIG. 6 from the motion signal 502 received during this later portion 538 of the PVAB period 536. In an example, the power conservation time period 535 may normally expire 85 ms before the expiration of the PVAB period 536. Control circuit 206 may terminate the power conservation time period 535 85 ms before the amplitude analysis window 538 when amplitude data is determined at block 304. It is to be understood, however, that the amplitude analysis window 538 may extend for all or any portion(s) of the PVAB period 536 in various examples and is not necessarily limited to only the later portion of the PVAB period 536. In some examples, the amplitude analysis window 538 may be enabled by control circuit 206 intermittently or during multiple intervals within the PVAB period 536.

Control circuit 206 may determine the maximum peak amplitude 570 of the rectified motion sensor signal 502 during the amplitude analysis window 538. Control circuit 206 may determine the time of the maximum peak amplitude 570 relative to the expiration of the PVAB period 536. For example, the peak amplitude to PVAB period expiration time interval 572 may be determined as amplitude data at block 304 of FIG. 6.

Additionally or alternatively, control circuit 206 may determine amplitude data at block 304 of FIG. 6 by determining whether the motion signal 502 crosses an amplitude threshold 578 during amplitude analysis window 538. Control circuit 206 may set the amplitude threshold 578 based on the first, higher A4 sensing threshold amplitude 546 or based on the second, lower sensing threshold amplitude 548 or a combination of both in some examples. For instance, the amplitude threshold 578 may be a percentage, e.g., 50%, 60%, 70%, 80%, 90% or 100% of the first, higher A4 sensing threshold amplitude 546. Control circuit 206 may alternatively set the amplitude threshold 578 to the first, higher A4 sensing threshold amplitude 546 less an offset.

When the motion signal 502 does cross the amplitude threshold 578 during the amplitude analysis window 538, control circuit 206 may determine the time interval 576 from an amplitude threshold crossing 574 to the expiration time of PVAB period 536. The threshold crossing 574 is a latest negative-going threshold crossing during amplitude analysis window 538 in the example shown in FIG. 7. Control circuit 206 may additionally or alternatively determine a time interval from a latest positive-going threshold crossing to the expiration of the PVAB period 536 in other examples.

Referring again to FIG. 6 with continued reference to FIG. 7, control circuit 206 determines whether the amplitude data determined at block 304 meets PVAB adjustment criteria at block 306. The PVAB adjustment criteria may include one or more thresholds, ranges or other amplitude-based or time-based requirements that are applied to the amplitude data to determine if the amplitude of the motion signal is likely to be greater than an A4 sensing threshold amplitude outside of a PVAB period. Control circuit 206 may apply the PVAB adjustment criteria by determining if amplitude-based requirements are met, e.g., by comparing a maximum peak amplitude to an amplitude threshold and/or determining whether and/or when an amplitude threshold crossing is detected. Control circuit 206 may apply the PVAB adjustment criteria by determining if time-based requirements are met, e.g., by comparing a time of the maximum peak amplitude and/or an amplitude threshold crossing time (e.g., relative to the expiration of the current PVAB period) to a threshold time interval as described in the examples below.

In some examples, control circuit 206 may compare the maximum peak amplitude 570 during the amplitude analysis window 538 to an amplitude threshold, e.g., amplitude threshold 578. When the maximum peak amplitude during the amplitude analysis window 538 is less than the amplitude threshold, PVAB adjustment criteria may be determined to be met at block 306. Control circuit 206 may adjust the PVAB period at block 308 by shortening the PVAB period, e.g., by decreasing the duration of the PVAB period from the ventricular electrical event to the expiration of the PVAB period. When the maximum peak amplitude during the amplitude analysis window of the PVAB period is greater than the amplitude threshold, however, control circuit 206 may determine that the PVAB adjustment criteria are not met at block 306. Control circuit 206 may not adjust the PVAB period at block 310 when the motion signal amplitude is relatively high at a time that is relatively late during the PVAB period as determined based on the PVAB adjustment criteria not being met at block 306. In other examples, e.g., as described below in conjunction with FIG. 8, control circuit 206 may increase the duration of the PVAB period in response to determining that the motion signal amplitude is greater than or equal to an amplitude threshold during the amplitude analysis window (or during at least a portion of the current PVAB period). The adjusted PVAB period, e.g., the decreased or increased PVAB period, may be applicable to one or more future cardiac cycles.

The amplitude threshold, e.g., amplitude threshold 578, that the maximum peak amplitude 570 is compared to may be based on the first, higher A4 sensing threshold amplitude 546. The amplitude threshold may be set equal to the first, higher A4 sensing threshold amplitude 546 applied during the A3 window 524 or to a percentage, e.g., 40% to 80%, of the first higher A4 sensing threshold amplitude. When the maximum peak amplitude 570 during the amplitude analysis window 538 of the current PVAB period is less than the amplitude threshold, control circuit 206 may determine that the PVAB adjustment criteria are met. The PVAB period 536 may be safely shortened, e.g., by a predetermined decrement that is equal to or shorter than the amplitude analysis window 538. When the motion signal amplitude is less than the amplitude threshold during the amplitude analysis window 538, the duration of the PVAB period 536 may be decreased with a low likelihood of oversensing the A2 event as a fused A3/A4 event.

Additionally or alternatively, control circuit 206 may compare the time interval 572 from maximum peak amplitude 570 to the expiration time of the current PVAB period 536 to a threshold time interval 580. When the maximum peak amplitude 570 is within a threshold time interval 580 before the expiration time of the current PVAB period 536, control circuit 206 may determine that PVAB adjustment criteria are not met at block 306. Control circuit 206 may withhold an adjustment to the PVAB period at block 310. If control circuit 206 determines that the maximum peak amplitude 570 of the motion signal 502 during the amplitude analysis window 538 occurs at a time earlier than the threshold time interval 580 from the expiration time of the current PVAB period 536, PVAB adjustment criteria may be determined to be met. The PVAB period 536 may be safely shortened at block 308. The PVAB period 536 may be decreased by 10 ms to 100 ms as examples and is decreased by 20 ms to 60 ms in some examples.

In some examples, the threshold time interval 580 may be set according to the amount of time that the PVAB period 536 is to be shortened. For example, control circuit 206 may be configured to adjust the PVAB period 536 by a predetermined decrement interval, which may be 50 ms as an example, when PVAB adjustment criteria are met. Control circuit 206 may set the threshold time interval 580 equal to the decrement interval plus a safety interval, e.g., a safety interval of 0 to 30 ms. For instance if the PVAB period is to be shortened by 50 ms, the threshold time interval 580 may be set to extend 50 ms plus 20 ms, or a total of 70 ms, earlier than the expiration time of the PVAB period 536. In this way, the PVAB period 536 may be shortened by a predetermined decrement interval at block 308 that is equal to or less than threshold time interval 580 with a low likelihood of the A2 event 506 being oversensed as a fused A3/A4 event after the adjusted expiration time of the PVAB period. The threshold time interval 580 represents a time interval beginning prior to and extending to the expiration of the PVAB period 536 in some examples and is therefore also referred to herein as a "PVAB ending time interval."

Additionally or alternatively, control circuit 206 may determine if the motion signal 502 crosses an amplitude threshold 578 during the amplitude analysis window 538 at block 306. When the motion signal 502 does not cross the amplitude threshold 578 during the amplitude analysis window 538, control circuit 206 may determine that the PVAB adjustment criteria are met at block 306. Control circuit 206 may shorten the PVAB period 536 at block 308. The PVAB period 536 may be shortened by an interval that is equal to or less than the amplitude analysis window 538 with a low likelihood of oversensing the A2 event 506 when the motion signal 502 does not cross the amplitude threshold 578 during the amplitude analysis window.

In some examples, the time of the latest threshold crossing 574 relative to the expiration of the current PVAB period 536 may be determined by control circuit 206 for selecting a decrement time interval used for shortening the duration of the PVAB period 536. For instance, control circuit 206 may determine the time interval 576 from the latest threshold crossing 574 to the expiration of the PVAB period 536. Control circuit 206 may decrease the PVAB period by a portion of the time interval 576, e.g., 40%, 50%, 60%, 70%, or 80% of the time interval 576. In this way, the PVAB period 536 may be shortened by control circuit 206 to expire earlier than the current PVAB period 536 but after the latest threshold crossing 574 to safely minimize the likelihood of oversensing the A2 event 506 after the expiration of an adjusted PVAB blanking period applied following a future ventricular event.

In still other examples, control circuit 206 may compare the threshold time interval 580 to the time interval 576 from a latest threshold crossing 574 by the motion signal during the amplitude analysis window 538 to the expiration of the PVAB blanking period 536. The amplitude threshold 578 used for determining the threshold crossing 574 may be based on the first, higher A4 sensing threshold amplitude 546 applied during the A3 window 524 as described above. Control circuit 206 may determine the latest threshold crossing 574 as the latest positive-going or the latest negative-going crossing of the amplitude threshold 578. When the latest threshold crossing 574 is earlier than the threshold time interval 580 from the expiration of the current PVAB period 536, control circuit 206 may determine that the PVAB adjustment criteria are met at block 306. The PVAB period 536 may be shortened at block 308 by control circuit 206. When the time of the latest threshold crossing 574 is within the PVAB ending time interval 580, e.g., within the threshold time interval from the expiration of the current PVAB period 536, control circuit 206 may determine that the PVAB adjustment criteria are not met at block 306. In response, control circuit 206 may hold the PVAB period constant at the current setting at block 310. In other examples, control circuit 206 may extend or lengthen the duration of the PVAB period 536 when the latest threshold crossing 574 is within the PVAB ending time interval 580. As described above, the PVAB ending time interval 580 may be set based on the amount of time that PVAB period 536 is to be adjusted by at block 308. For instance, when the PVAB period 536 is to be adjusted by a 50 ms time interval, the PVAB ending time interval 580 may be set to 50 ms or 50 ms plus a predetermined offset or percentage greater than 50 ms. The PVAB ending time interval 580 may be between 20 and 100 ms, as examples.

Referring again to FIG. 6, control circuit 206 may adjust the PVAB period 536 at block 308 by shortening the PVAB period by a predetermined decrement interval when the PVAB adjustment criteria are determined to be met. The decrement interval may be 10 ms, 20 ms, 30 ms, 40 ms, 50 ms, 60 ms, 70 ms, 80 ms, 90 ms or 100 ms as examples. In other examples, the PVAB period 536 may be decreased by a predetermined percentage or decreased based on a current ventricular rate, which may be a ventricular paced rate or sensed ventricular rate. For example, the PVAB period 536 may be adjusted in a linear manner between two heart rates. To illustrate, the PVAB period 536 may be adjusted between a maximum PVAB period of 550 ms at a lower heart rate limit of 80 beats per minute and decrease to a minimum of 500 ms at an upper heart rate limit of 110 beats per minute. At heart rates below the lower heart rate limit, the PVAB period 536 may be held at the maximum of 550 ms. At heart rates above the upper heart rate limit, the PVAB period 536 may be held at the minimum of 500 ms. The maximum PVAB period may be set to 500 to 800 ms as examples. The lower heart rate limit may be between 60 and 90 beats per minute as examples. The minimum PVAB period may be set to 400 ms to 700 ms as examples. The upper heart rate limit may be between 90 and 120 beats per minute as examples.

The amplitude analysis window 538 and the threshold time interval 580 are shown as two different time intervals in FIG. 7. In some examples, the PVAB adjustment criteria may include multiple requirements that utilize both the amplitude analysis window 538 and the threshold time interval 580. For instance, the PVAB adjustment criteria for shortening the PVAB period 536 may require that the maximum peak amplitude during the amplitude analysis window 538 is less than a first amplitude threshold and that the motion signal does not cross a second amplitude threshold, which may be equal to or less than the first amplitude threshold, during the threshold time interval 580. In this case, control circuit 206 may set both the amplitude analysis window 538 and the threshold time interval 580 to two different time intervals and may set one or two different amplitude thresholds applied to the motion signal during the PVAB period 536 for determining amplitude data.

It is to be understood, however, that the amplitude analysis window 538 may be equal to the threshold time interval 580 in some examples. Control circuit 206 may set a single window or time interval during the later portion of the PVAB period 536 for determining when the PVAB adjustment criteria are met based on amplitude data. For example, control circuit 206 may set the PVAB ending time interval 580 as both as the threshold time interval extending to the expiration of the PVAB period 536 and as the amplitude analysis window. In some examples, control circuit 206 may determine that the PVAB adjustment criteria are met when the motion signal amplitude is not greater than, or the motion signal 502 does not cross, an amplitude threshold 578 during the PVAB ending time interval 580.

The flow chart 300 of FIG. 6 has been described with regard to a PVAB period adjustment that is a decrease in the PVAB period 536 at block 308. Control circuit 206 may perform the process of flow chart 300 in response to detecting an increase in the ventricular rate. When the ventricular rate is increased, such that the time intervals between atrial synchronized ventricular pacing pulses are shortened for example, a shortening of the PVAB period may be warranted. In order to avoid oversensing the A2 event, control circuit 206 may perform the method of flow chart 300 to verify that an amplitude of the motion signal near the expiration of the current PVAB blanking period, or during a threshold time interval such as PVAB ending time interval 580 that would be after the expiration of a potentially shortened PVAB blanking period, is not near or greater than the first, higher A4 sensing threshold amplitude 546 or another selected amplitude threshold. When the ventricular rate decreases again, the PVAB period may be increased without an analysis of the amplitude of the motion signal during the PVAB period in some examples. By increasing the PVAB period, the likelihood of oversensing the A2 event is decreased since the expiration of the PVAB period is later in the ventricular cycle and most likely after the A2 event. Accordingly, in some examples, control circuit 206 may perform the method of flow chart 300 only when a potential adjustment to the PVAB period, e.g., due to an increased ventricular rate, is a decrease or shortening of the PVAB period. In other examples, however, control circuit 206 may determine and analyze motion signal amplitude data to verify that the current PVAB period is appropriate or should be shortened (decreased) or lengthened (increased) for avoiding A2 event oversensing, which may be in response to both increases and decreases in ventricular rate and/or in response to changes in the frequency and/or timing of A4 event sensing, for example.

Figure 8:
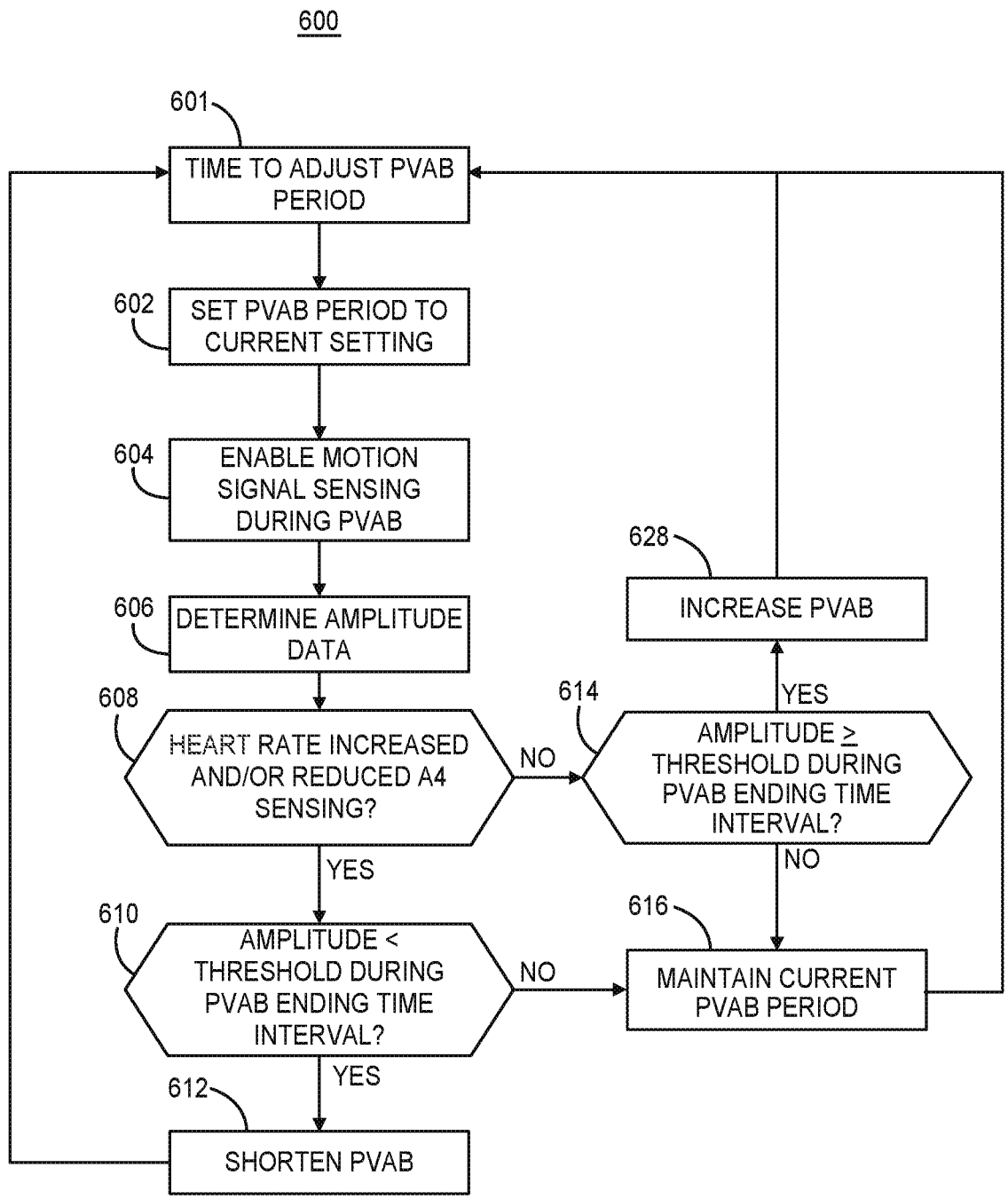
FIG. 8 is a flow chart of a method for controlling PVAB period adjustments according to another example.

FIG. 8 is a flow chart 600 of a method for controlling PVAB period adjustments according to another example. At block 601, control circuit 206 may determine that it is time to adjust the PVAB period. Control circuit 206 may perform the method of flow chart 600 at the time of pacemaker implant, on a periodic basis, e.g., once per minute, once per hour, every four hours, every eight hours, every twelve hours, once per day or other scheduled frequency. Control circuit 206 may determine that it is time to adjust the PVAB period at block 601 in response to a scheduled time of day or the expiration of a PVAB adjustment timer in some examples.

Additionally or alternatively, control circuit 206 may determine that it is time to adjust the PVAB period at block 601 in response to detecting a change in the heart rate, which may be an atrial rate and/or ventricular rate. Control circuit 206 may determine RRIs as the time intervals between consecutive pacing pulses and/or sensed ventricular event signals during an atrial synchronized ventricular pacing mode (or during an asynchronous ventricular pacing mode that includes atrial sensing). A mean or median of the most recent X RRIs may be determined as a representative value corresponding to the current ventricular rate and compared to a previously determined RRI. For the sake of illustration, the median RRI may be determined after every 8 RRIs as the median of the 8 RRIs. The most recent median RRI may be compared to a previously determined median RRI, which may be the most recent preceding median RRI and/or one or more earlier median RRIs that may represent the ventricular rate at an earlier time, e.g., approximately 30 seconds earlier, one minute earlier, two minutes earlier, five minutes earlier, etc. to account for relatively faster and slower changes that could occur in the ventricular rate. When the difference between the current median RRI and a previously determined median RRI is greater than a rate change threshold, e.g., corresponding to an increase or decrease in the ventricular rate of 10 beats per minute (bpm), 20 bpm, 30 bpm or other rate change threshold, control circuit 206 may determine that it is time to adjust the PVAB period at block 601.

Additionally or alternatively, control circuit 206 may determine it is time to adjust the PVAB period when the heart rate crosses one or more rate thresholds. For example, control circuit 206 may determine that the ventricular rate has changed between being greater than or equal to 100 bpm to being less than 100 bpm. Control circuit 206 may determine that it is time to adjust the PVAB period at block 601 based on the ventricular rate crossing the rate threshold of 100 bpm. For instance, control circuit 206 may determine a median RRI (which may be based on paced and/or sensed RRIs determined between consecutive ventricular events) and compare the median RRI to a threshold interval. The threshold interval may be 500 ms, 600 ms, 700 ms or other selected threshold interval that corresponds to a ventricular rate threshold. When the median RRI has changed from being less than or equal to the threshold interval to being greater than the threshold interval or vice versa, control circuit 206 may determine that it is time to adjust the PVAB period at block 601.

Control circuit 206 may compare the median RRI to two more threshold intervals in some examples, such as a 1000 ms threshold, a 700 ms threshold and a 500 ms threshold corresponding to changes in heart rate from less than or equal to 60 bpm, between 60 bpm and about 85 bpm, between about 86 bpm and 120 bpm and greater than 120 bpm. Other threshold intervals corresponding to other heart rate thresholds may be selected. When a threshold interval is crossed by the median RRI compared to a previously determined median RRI, control circuit 206 may determine that it is time to adjust the PVAB period at block 601. While the foregoing examples relating to heart rate changes refer to changes in the ventricular rate determined based on RRIs, the heart rate or changes in the heart rate may be determined based on a rate of sensed atrial events in some examples.

In still other examples, control circuit 206 may determine that it is time to adjust the PVAB period at block 601 based on an analysis of the frequency and/or timing of sensed atrial event signals. In some examples, control circuit 206 may determine that it is time to adjust the PVAB in response to regular, atrial event sensing occurring after the A3 window (during the A4 window) in a 1:1 ratio with ventricular events. When atrial events are being reliably sensed during the A4 window consistently on a beat-to-beat basis, control circuit 80 may analyze the motion signal amplitude during the PVAB period. If the motion signal amplitude is below a threshold amplitude, e.g., less than half of the first A4 sensing threshold amplitude applied during the A3 window, the PVAB period could be shortened because the likelihood of oversensing A2 events is relatively low when the motion signal amplitude is low during the PVAB period.

In another example, if an atrial event signal has not been sensed for one or more ventricular cycles, control circuit 206 may determine that it is time to adjust the PVAB period at block 601. Control circuit 260 may determine if the atrial event signal has been sensed for less than X out of Y most recent ventricular cycles, e.g., less than four out of eight, less than two out of eight or other ratio or percentage of a predetermined number of most recent ventricular cycles. When fewer than a threshold number or percentage of atrial event signals have been sensed out of the most recent predetermined number of ventricular cycles, control circuit 206 may determine that it is time to adjust the PVAB period at block 601. In some examples, control circuit 206 may adjust other atrial event sensing control parameters, e.g., the ending time of the A3 window and/or the A4 sensing threshold amplitude before adjusting the PVAB period when atrial event sensing is irregular or lost. Control circuit 206 may determine that it is time to adjust the PVAB period after adjustments to other atrial event sensing control parameters have been exhausted.

Additionally or alternatively, control circuit 206 may determine when atrial event signals are being sensed during the ventricular cycle. Referring again to FIG. 7, control circuit 206 may determine how often atrial event signals are sensed within an early portion 582 of the A3 window 524. Atrial event signals sensed during the early portion of the A3 window 524 may correspond to oversensed A2 signals due to the PVAB period being too short. Accordingly, control circuit 206 may count the number of atrial event signals that are sensed during the early portion 582 (shown in FIG. 7) of the A3 window. The early portion 582 of the A3 window 524 is also referred to herein as the "A3 window beginning time interval" because it extends from the start of the A3 window 524 for a predetermined time interval after the expiration of the PVAB period 536. The duration of the A3 window beginning time interval 582 may be 50 ms, 100 ms, 150 ms or other selected time interval and may be set based on a predetermined increment that is used to increase the PVAB period, a maximum allowable PVAB period, or other adjustment that may be applied to the PVAB period 536 to increase the duration of the PVAB period following a ventricular event. When a threshold number or percentage of all sensed atrial events over a predetermined time interval or number of ventricular cycles are sensed during the A3 window beginning time interval 582, control circuit 206 may determine that it is time to adjust the PVAB period 536. To illustrate, when two, three, four, six or eight out of the eight most recently sensed atrial event signals are sensed during the A3 window beginning time interval 582, control circuit 206 may determine that it is time to adjust the PVAB period.

In still other examples, control circuit 206 may be configured to determine that it is time to adjust the PVAB period at block 601 based on a threshold number of ventricular pacing pulses being delivered at a ventricular lower rate interval (e.g., due to the absence of sensed atrial event signals) during an atrial synchronized ventricular pacing mode. When a threshold number of asynchronous ventricular pacing pulses are delivered, the PVAB period may be too long causing missed sensing of the atrial event signals.

In various examples, control circuit 206 may be configured to determine that it is time to adjust the PVAB period at block 601 based on one or more requirements that may be met alone or in combination and may include any of the examples described above. Control circuit 206 may determine that it is time to begin the process of determining amplitude data from the motion signal based on the time of day, a scheduled PVAB period adjustment frequency, the ventricular rate, the rate or timing of the atrial sensed event signals, a maximum number of adjustments of other atrial event sensing control parameters being reached, the frequency or number of asynchronous ventricular pacing pulses, or any combination thereof. It is contemplated that other criteria may be used than the example criteria described above for causing control circuit 206 to determine that it may be time to adjust the PVAB period and begin determining amplitude data from the motion signal.

Upon determining that it is time to adjust the PVAB period at block 601, control circuit 206 may set the PVAB period to the currently active setting at block 602 in response to an identified ventricular event, e.g., a ventricular pacing pulse delivered by pulse generator 202 or a ventricular event signal sensed from the cardiac electrical signal by sensing circuit 204. Control circuit 206 may enable sensing and analysis of the motion signal during the PVAB period, or at least during an amplitude analysis window of the PVAB period, at block 604. As described above, control circuit 206 may disable motion sensor 212 or at least processing of the motion signal to conserve power source 214 during the PVAB period during atrial synchronized ventricular pacing. Control circuit 206 may enable sensing and analysis of the motion signal starting from the expiration of the PVAB period (or a power conservation time period) until the start of the next PVAB period on a beat-by-beat basis until control circuit 206 determines that it is time to adjust the PVAB period at block 601. At block 604, in response to determining that it is time to adjust the PVAB period, control circuit 206 may maintain power to motion sensor 212 throughout one or more ventricular cycles to enable amplitude data to be determined during the PVAB period at block 606. In some examples, control circuit 206 may disable motion sensor 212 during an early portion of the PVAB blanking period to still conserve power during a portion of the PVAB period and provide power to motion sensor 212 during at least an amplitude analysis window occurring during a later portion of the PVAB period for one or more ventricular cycles.

At block 606, control circuit 206 determines amplitude data from the motion signal during the amplitude analysis window according to any of the examples described above, e.g., in conjunction with FIG. 7. At block 608, control circuit 206 may determine whether the heart rate is increased, e.g., based on RRIs as generally described above in conjunction with block 601. Regardless of what triggered control circuit 206 to determine that it is time to adjust the PVAB period, e.g., a scheduled time or reduced and/or early atrial event sensing, control circuit 206 may determine the heart rate, e.g., by determining a median RRI and determining if the median RRI represents an increase in heart rate based on a comparison to a previously determined median RRI. In this way, control circuit 206 may determine that a decrease in the PVAB period may be needed. In some cases, it is a change in the heart rate that is determined at block 601, that triggers control circuit 206 to determine that it is time to adjust the PVAB period and start the process of flow chart 600. In that case, control circuit 206 does not necessarily redetermine whether the ventricular rate has increased or decreased at block 608 but may rely on the earlier determination. In other examples, control circuit 206 may determine if the heart rate has crossed a rate threshold, e.g., from a lower to a higher heart rate at block 608.

Additionally or alternatively to determining if the ventricular rate is increased at block 608, control circuit 206 may determine if atrial events are being sensed infrequently at block 608. Control circuit 206 may determine if a reduced frequency of atrial events, e.g., less than a 1:1 ratio with ventricular events, is occurring. In this case, the PVAB period may be too long and interfering with atrial event sensing, particularly when the reduced number of sensed atrial events are only or mostly being sensed during the early portion of the A3 window, e.g., during an A3 window beginning time interval 582 (shown in FIG. 7). In other instances, if intermittent sensing of atrial events (e.g., less than a 1:1 ratio with ventricular events) occurs after a period of regular sensing of atrial events during the A3 window and in a 1:1 ratio with ventricular events, the PVAB period may need to be shortened. Any of the example methods described above for determining a reduced frequency and/or early atrial event signal sensing during the A3 window may be used by control circuit 206 at block 608. In some cases, it is a determination of reduced frequency of atrial event sensing and/or early atrial event sensing during the A3 window that is determined by control circuit 206 at block 601 as being the trigger for starting the process of determining amplitude data for adjusting the PVAB period. In this case, control circuit 206 does not necessarily need to redetermine the frequency and/or timing of atrial event sensing at block 608 and may rely on the previous determination made at block 601.

When control circuit 206 determines that the heart rate is increased and/or the frequency of atrial event sensing is reduced ("yes" branch of block 608), control circuit 206 may determine that a possible shortening of the PVAB period is needed to restore or maintain reliable atrial event sensing. Before shortening the PVAB period at block 612, control circuit 206 analyzes the amplitude data determined at block 606. For example, control circuit 206 may verify that the amplitude of the motion signal is less than an amplitude threshold during the PVAB ending time interval, e.g., time interval 580 shown in FIG. 7. Any of the techniques described above in conjunction with FIGS. 6 and 7 for determining if PVAB adjustment criteria are met for shortening the PVAB period may be used at block 610 for determining that the PVAB period can be shortened at block 612.

When the amplitude data meet criteria applied at block 610 for enabling shortening of the PVAB period, control circuit 206 may adjust the PVAB period by a predetermined decrement interval or percentage, to a predetermining shortened PVAB period, to a percentage of the current PVAB period, or based on the current ventricular cycle interval in various examples. For instance, when the ventricular rate is increased above a threshold rate, and the motion signal amplitude is less than an amplitude threshold during the PVAB ending time interval 580 (FIG. 7), control circuit 206 may decrease the PVAB period to a predetermined shortened PVAB period, e.g., to 500 ms. The PVAB period may be decreased according to any of the examples given above. It is to be understood that a minimum PVAB period limit may be set by control circuit 206, e.g., based on the ventricular rate, or stored in memory 210 as a fixed minimum. When the PVAB period is at the minimum PVAB period limit, control circuit 206 does not decrease the PVAB period further. After adjusting the PVAB period at block 612, control circuit 206 returns to block 601 to wait until the next determination is made that it is time to adjust the PVAB period.

If the amplitude of the motion signal does not meet criteria applied at block 610, e.g., if the motion signal amplitude is equal to or greater than a threshold amplitude during the PVAB ending time interval, control circuit 206 may determine that the PVAB period should not be shortened. Control circuit 206 may hold the PVAB period constant at the current setting at block 616 and withhold making an adjustment to the PVAB period. Control circuit 206 may then return to block 601 to wait for the next determination that it is time to adjust the PVAB period.

Returning to block 608, when the ventricular rate is decreased or relatively unchanged ("no" branch) and/or regular atrial event signal sensing is occurring (e.g., 1:1 with the ventricular events), particularly when regular atrial event signal sensing is occurring only or mostly very early, e.g., in the A3 window beginning time interval 582 (shown in FIG. 7), an increase in the PVAB period may be appropriate to reduce the likelihood of oversensing A2 events. Control circuit 206 may advance to block 614 to determine if the amplitude data meet criteria for increasing the PVAB period before increasing the PVAB period at block 628.

At block 614, control circuit 206 may compare the amplitude data to criteria for justifying a PVAB period increase. For instance, control circuit 206 may determine if the motion signal amplitude is greater than a threshold during the PVAB ending time interval 580 (shown in FIG. 7). When the motion signal amplitude is greater than an amplitude threshold near the end of the PVAB period, an increase in the PVAB period may be warranted to reduce the likelihood of the A2 event signal extending into the A3 window and causing false sensing of atrial event signals. In response to determining that motion signal amplitude is greater than an amplitude threshold during the PVAB ending time interval 580, control circuit 206 may increase the PVAB period at block 628.

In other examples, when the ventricular rate is decreased, control circuit 206 may advance directly to block 628 to increase the PVAB period without an analysis of the determined amplitude data. The PVAB period may be increased at block 628 by a predetermined increment, by a percentage of the current PVAB period, based on the current median RRI, or to a predetermined extended PVAB period, e.g., to 550 ms. If the PVAB period is already at a maximum limit, control circuit 206 may not increase the PVAB period to be longer than the maximum limit. The maximum limit may be stored in memory 210 or determined by control circuit 206 based on the ventricular rate.

When the amplitude of the motion signal during the PVAB ending time interval (or during the amplitude analysis window as shown in FIG. 7) is less than an amplitude threshold ("no" branch of block 614), control circuit 206 may maintain the current PVAB period at block 616 without making an adjustment. After either holding the PVAB period at the current setting (block 616) or increasing the PVAB period (block 628), control circuit 206 may return to block 601 to wait for the next determination that it is time to adjust the PVAB period.

Figure 9:
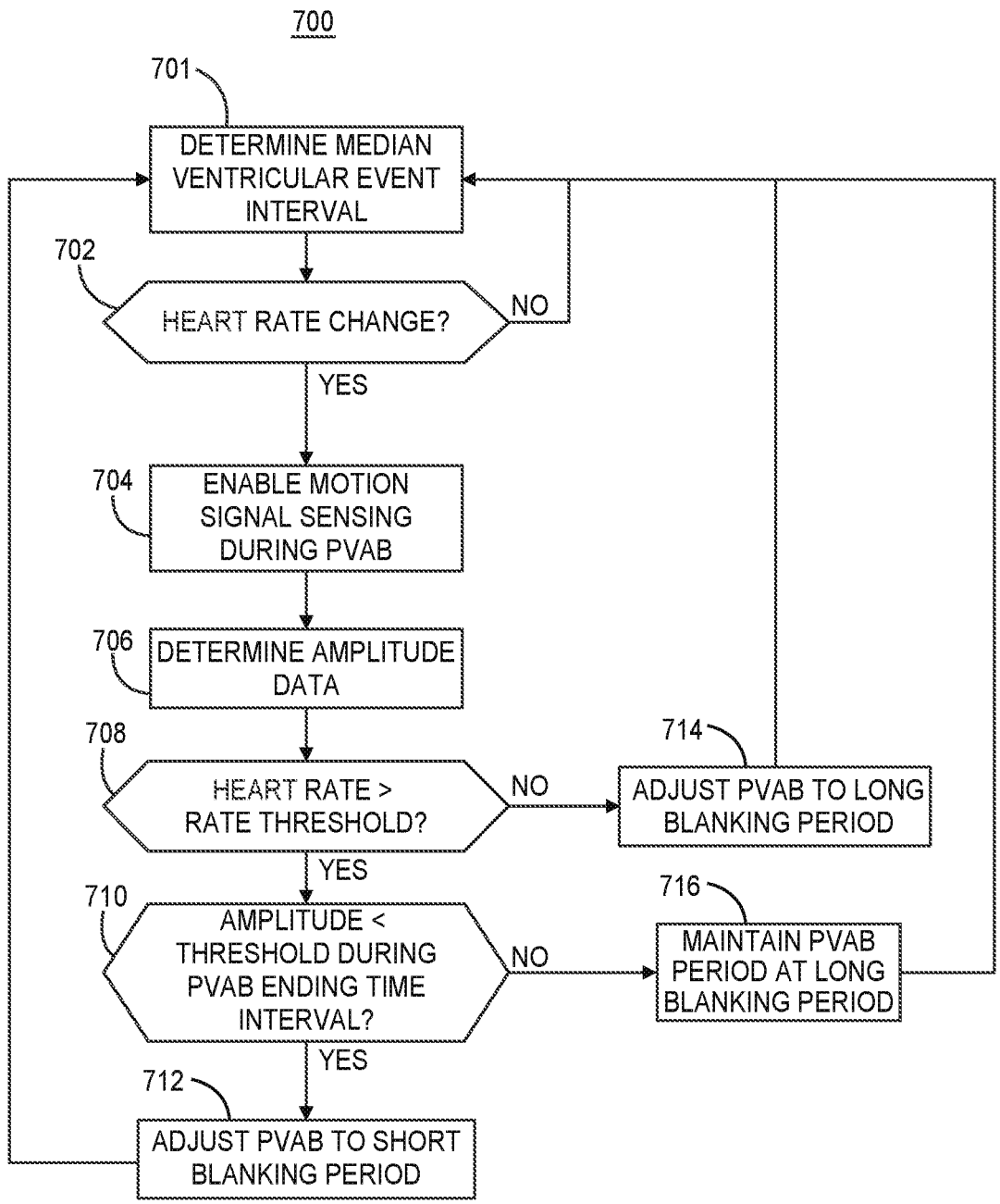
FIG. 9 is a flow chart of a method for adjusting the PVAB period according to another example.

FIG. 9 is a flow chart 700 of a method for adjusting the PVAB period according to another example. At block 701, control circuit 206 determines a median RRI. As described above, after every X RRIs where X may be four, eight, sixteen, or thirty-two as examples with no limitation intended, control circuit 206 may determine a median of the X RRIs. The X RRIs may include paced and/or sensed ventricular events. It is recognized that other methods may be used to determine a representative RRI or associated ventricular rate (or heart rate). Other methods may include determining a running average, mean, trimmed median, minimum, maximum or other metric of a predetermined number of RRIs. Other methods may include determining a running average, mean, trimmed median, minimum, maximum or other metric of all RRIs that occur over a predetermined time interval, e.g., 30 seconds, one minute, two minutes, five minutes or other time interval, which may result in a variable number of RRIs.

At block 702, control circuit 206 determines if a ventricular rate change is detected based on the median (or other representative) RRI. In some examples, control circuit 206 may compare the median RRI to a rate interval threshold at block 702. If the median RRI has crossed a rate interval threshold at block 702, a ventricular rate change is detected. For example, if the current median RRI is greater than a rate interval threshold and the preceding median RRI is less than or equal to the rate interval threshold or vice versa, control circuit 206 may detect a ventricular rate change at block 702. In an illustrative example, control circuit 206 determines if the ventricular rate corresponding to the current median RRI has increased to a rate greater than a threshold rate such as 100 bpm or has decreased to a rate that is less than or equal to the threshold rate of 100 bpm from a previously determined ventricular rate. If a ventricular rate change is not detected at block 702, control circuit 206 returns to block 701. When a ventricular rate change is not detected, control circuit 206 may hold the PVAB period at the current setting without any adjustment. It is recognized that in some examples a heart rate change may be detected at block 702 based on determining a rate of sensed atrial events, e.g., by determining time intervals between consecutively sensed atrial event signals.

When control circuit 206 detects a heart rate change at block 702, control circuit 206 may enable motion signal sensing and analysis during the PVAB period at block 704 as described above. It is to be understood that while sensing and analysis of the motion signal is enabled during the PVAB period, sensing of atrial event signals remains disabled or any atrial event signals sensed during the blanking period are ignored by control circuit 206 for the purposes of starting an AV pacing interval.

At block 706, control circuit 206 determines amplitude data from the motion signal received during at least a portion of the PVAB period according to any of the examples described above. At block 708, control circuit 206 determines if the current heart rate is greater than the rate threshold. If a rate increase was detected at block 702, the heart rate is greater than the rate threshold at block 708. If a rate decrease was detected at block 702, the heart rate is less than or equal to the rate threshold at block 708.

When the heart rate, e.g., the ventricular rate, is greater than the rate threshold ("yes" branch of block 708), control circuit 206 may determine if the amplitude of the motion signal is less than an amplitude threshold during the PVAB ending time interval at block 710. Any of the techniques described above in conjunction with FIGS. 6 and 7 may be used at block 710 to determine that adjustment criteria are met based on the determined amplitude data for allowing the duration of the PVAB period to be shortened at block 712.

When the amplitude of the motion signal is less than the amplitude threshold during the PVAB ending time interval (e.g., time interval 580 shown in FIG. 7), control circuit 206 adjusts the PVAB period to a short blanking period at block 712. Whenever control circuit 206 determines that the ventricular rate has increased to a rate greater than a rate threshold, e.g., a rate threshold of 90 to 120 bpm, and the amplitude of the motion signal is not greater than an amplitude threshold during the PVAB ending time interval of the current PVAB period, control circuit 206 may adjust the PVAB period to a predetermined short blanking period at block 712. The short blanking period may be 500 ms to 550 ms as examples.

When control circuit 206 determines that the amplitude of the motion signal is greater than or equal to the amplitude threshold during the PVAB ending time interval ("no" branch of block 710), control circuit 206 withholds an adjustment to the PVAB period in response to the detected increase in ventricular rate. When the motion signal amplitude is greater than or equal to the amplitude threshold during a PVAB period, which may be currently set to the long blanking period duration, control circuit 206 may withhold selecting a short blanking period duration in response to the heart rate being faster than a threshold rate, e.g., based on a representative RRI being less than a threshold interval. The PVAB period may be maintained at the current PVAB period at block 716, which may be a predetermined long blanking period that can be set whenever the ventricular rate is less than or equal to the rate threshold (e.g., when a RRI is greater than or equal to a corresponding threshold interval) and/or the motion signal amplitude is high during the PVAB period. The long blanking period may be 550 to 600 ms as examples. Control circuit 206 may select the long blanking period duration at block 716 in response to determining that the amplitude is greater than or equal to the threshold amplitude ("no" branch of block 710) during one or more PVAB periods (that may be set to the long blanking period duration) and the ventricular rate is faster than a rate threshold ("yes" branch of block 708), e.g., based on a ventricular event interval being less than a threshold interval.

Returning to block 708, when control circuit 206 determines that the heart rate, e.g., the ventricular rate, has decreased to a rate that is less than or equal to the rate threshold ("no" branch of block 708), control circuit 206 may increase the PVAB period from the short blanking period to the long blanking period at block 714. In the example shown, control circuit 206 does not necessarily perform an analysis of the amplitude data when a ventricular rate decrease to less than or equal to the rate threshold is detected. Extending the PVAB period to the predetermined long blanking period is expected to safely maintain reliable atrial event sensing because the long blanking period is likely to encompass the A2 event, and the long blanking period is selected to expire before an expected time of the A3 event. An analysis of the amplitude data may be performed by control circuit 206, for example, only when a ventricular rate increase to greater than the threshold rate is detected because shortening the PVAB period from the long blanking period to the short blanking period in response to a ventricular rate increase could lead to oversensing of the A2 event if the amplitude of the motion signal is relatively high near the end of the long blanking period.

Control circuit 206 is described in conjunction with FIG. 9 as detecting a ventricular rate that is greater than or less than a single rate threshold for toggling the PVAB period between a long blanking period and a short blanking period. Adjusting to the short blanking period is withheld, however, when the motion signal amplitude is greater than a threshold during a late portion of the long blanking period. It is to be understood, however, that control circuit 206 may detect ventricular rate changes between three or more rate zones, e.g., a low rate zone less than or equal to 60 bpm, a moderate rate zone greater than 60 bpm and less than or equal to 100 bpm and a high rate zone greater than 100 bpm. In this case, control circuit 206 may adjust the PVAB period between a long blanking period (e.g., 600 ms), a moderate blanking period (e.g., 550 ms), and short blanking period (e.g., 500 ms) in response to detecting a heart rate change from one zone to another. The PVAB periods, e.g., a short or minimum PVAB period and a long or maximum PVAB period and any intermediate PVAB periods, may be programmable by a user, e.g., using external device 20. Additionally or alternatively, the heart rate(s) at which switching between one PVAB period and another PVAB period may be programmable by a user.

When the PVAB period is shortened from the long blanking period to the moderate or short blanking period, control circuit 206 may first verify that the motion signal amplitude is less than an amplitude threshold during a PVAB period ending time of the long blanking period. As described above, the PVAB period ending time may be set to the amount of time that the PVAB period is to be decreased. Continuing the illustrative example of a long 600 ms blanking period applied during a low ventricular rate zone, a moderate 550 ms blanking period applied during a moderate rate zone, and a short 500 ms blanking period during a high rate zone, the PVAB period ending time used during the motion signal amplitude analysis performed at block 710 may be set to 50 ms plus an optional safety offset when the ventricular rate has increased from the low rate zone to the moderate rate zone or from the moderate rate zone to the high rate zone. The PVAB period may be safely decreased from the long blanking period to the moderate blanking period or from the moderate blanking period to the short blanking period when the motion signal amplitude is less than an amplitude threshold during the respective PVAB period ending time. The PVAB period ending time may be set to 100 ms plus an optional safety offset when the ventricular rate has increased from the low rate zone to the high rate zone to allow the PVAB blanking period to be safely decreased from the long blanking period to the short blanking period when the motion signal amplitude is less than an amplitude threshold during the relatively longer PVAB period ending time.

Figure 10:
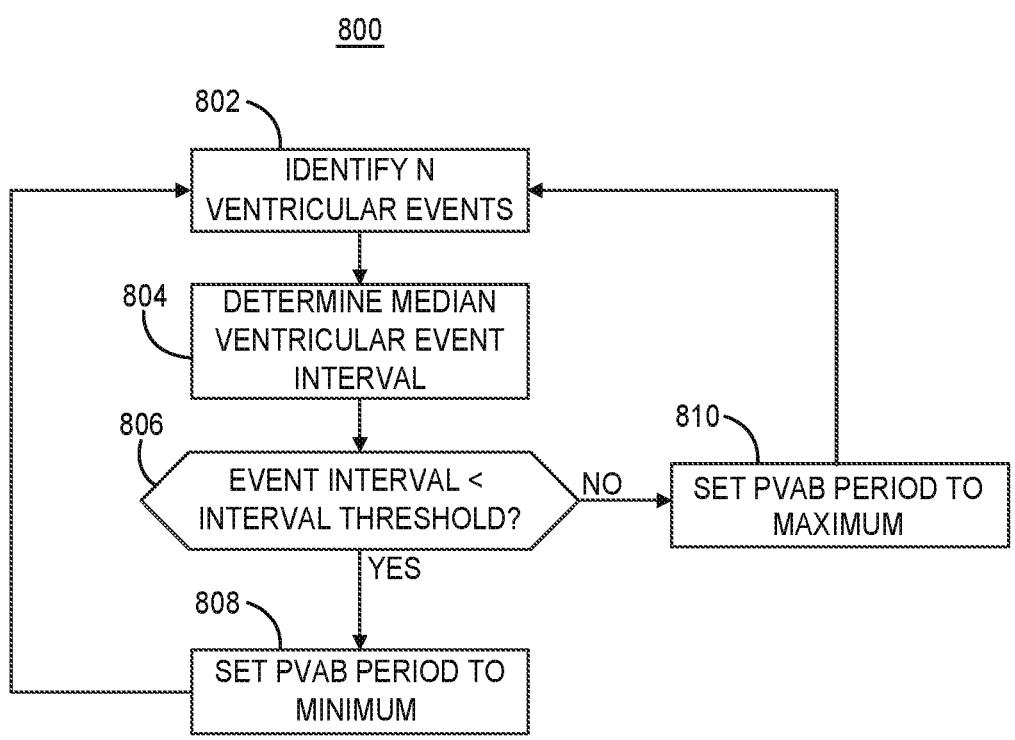
FIG. 10 is a flow chart of a method for setting the PVAB period and atrial synchronized ventricular pacing according to another example.

FIG. 10 is a flow chart 800 of a method for setting the PVAB period according to another example. The process of flow chart 800 may be performed by control circuit 206 during a variety of operating or pacing modes. In this way, a selected duration of the PVAB period may be set to a currently relevant value for use in atrial event signal sensing during a current operating mode and/or during a subsequent operating mode, e.g., after a pacing mode switch. For example, control circuit 206 may be configured to operate in an atrial synchronous ventricular pacing mode, which may be denoted as a VDD pacing mode. Control circuit 206 may additionally be configured to operate in one or more asynchronous ventricular pacing modes, which may include dual chamber or single chamber sensing and may include a rate response ventricular pacing mode. Examples of asynchronous pacing modes may be denoted as a VDI pacing mode, VVI pacing mode, and a VDIR pacing mode. Control circuit 206 may additionally be configured to operate in a sensing without pacing mode which may include single chamber or dual chamber sensing, which may be denoted as an OVO mode or ODO mode, respectively. It is to be understood that during operating modes that include dual chamber sensing, the atrial event sensing may be performed by atrial event detector circuit 240 (FIG. 3) using the motion signal received from motion sensor 212, and ventricular event sensing may be performed by sensing circuit 204 using a cardiac electrical signal, e.g., sensed from electrodes 162 and 164.

The process of flow chart 800 may be performed during any pacing mode, including sensing without pacing modes, for selecting and updating the PVAB period on an ongoing basis. As described below, the duration of the PVAB period may be selected based on a recently determined representative RRI. When the pacing mode is switched to the atrial synchronous ventricular pacing mode, e.g., the VDD pacing mode, from any other pacing mode, e.g., an asynchronous ventricular pacing mode, a single chamber sensing mode, or any other pacing mode which may include any of the VDI, VVI, VVIR, OVO or ODO pacing modes listed above, the PVAB period is set to a currently relevant duration based on the most recently determined RRI(s) so that reliable atrial event sensing is promoted during the atrial synchronous ventricular pacing mode. Furthermore, during any asynchronous ventricular pacing mode or sensing only mode that includes dual chamber sensing, e.g., VDI or ODO, the PVAB period may be set to a currently relevant duration based on the most recently determined RRI(s) for promoting reliable atrial event signal sensing. Atrial event signal sensing may be performed during an asynchronous ventricular pacing mode for use in diagnostic functions or other device functions such as setting atrial event sensing control parameters, e.g., as described in the above-incorporated U.S. Pat. No. 10,449,366 (Splett, et al.), U.S. patent application Ser. No. 17/159,596 (Sheldon, et al.), and U.S. patent application Ser. No. 17/159,635 (Sheldon, et al.).

At block 802, control circuit 206 identifies N ventricular events, e.g., 1 to 12 ventricular events or 6 to 8 ventricular events in some examples. As described above, ventricular events may be identified by control circuit 206 as sensed events, e.g., in response to a ventricular sensed event signal received from sensing circuit 204, or ventricular pacing pulses delivered by pulse generator 202. At block 804, control circuit 206 may determine a representative RRI, e.g., a median RRI as shown in FIG. 10, from the N ventricular events. In an illustrative example, control circuit 206 may buffer the most recent 8 RRIs in memory 210. Control circuit 206 may identify the $4^{th}$ shortest interval out of the 8 buffered intervals as a "median" RRI at block 804. In other examples, the representative RRI determined at block 804 may be an average, minimum, maximum, nth longest (or shortest), or trimmed mean or median RRI.

Control circuit 206 may compare the representative RRI to a threshold interval at block 806. The threshold interval may be a predetermined or programmable value stored in memory 210 and may be between 800 ms and 500 ms, as examples, and can be between 750 ms and 600 ms. The threshold interval may correspond to a ventricular rate of 75 to 120 bpm or about 80 to 110 bpm, for instance. A default value of the threshold interval can be 665 ms corresponding to a ventricular rate of about 90 bpm, as an example.

When the RRI is less than the threshold interval, control circuit 206 may set the PVAB period to a minimum PVAB period at block 808. The minimum PVAB period may be a duration of 400 to 650 ms, as examples, and may be programmable between 425 ms and 575 ms with a default value of 500 ms in some examples. In other examples, the minimum PVAB period may be established by control circuit 206 based on motion signal amplitude data determined according to any of the examples given above. Control circuit 206 may determine the amplitude of the motion signal during one or more PVAB periods, which may be set to the maximum PVAB period in some instances. Control circuit 206 may set the minimum duration of the PVAB period based on the determined amplitude of the motion signal.

For example, if the motion signal peak amplitude is less than a threshold amplitude during the maximum PVAB period, the minimum PVAB period may be set to the shortest PVAB period available or a default PVAB period. If the motion signal peak amplitude is greater than the threshold amplitude, however, the minimum PVAB period may be set relatively longer based on amplitude timing data in some examples. For instance, control circuit 206 may determine a time of a maximum peak amplitude or latest threshold crossing of the motion signal during one or more PVAB periods, which could be currently set to the maximum PVAB period. Control circuit 206 may set the minimum PVAB period based on the determined time of the maximum peak amplitude or latest threshold crossing. In one example, the minimum PVAB period is set to be at least a safety interval or offset longer than the time of the maximum peak amplitude or latest threshold crossing.

While not shown explicitly in FIG. 10, but as described above in conjunction with FIG. 9, in some examples, before selecting the minimum PVAB period at block 808 in response to the representative RRI being less than the threshold interval, control circuit 206 may enable sensing of the motion signal during one or more PVAB periods to check the amplitude of the motion signal. When the amplitude of the motion signal is greater than a threshold amplitude, e.g., during a PVAB period ending time as described in conjunction with FIG. 7, control circuit 206 may withhold selecting the minimum PVAB period in response to the representative RRI being less than the threshold interval. Control circuit 206 may select a maximum PVAB period (block 810) in response to determining that the motion signal amplitude is greater than or equal to a threshold amplitude during one or more PVAB periods when the RRI is less than the threshold interval.

When the representative RRI is greater than or equal to the threshold interval ("no" branch of block 806), control circuit 206 may set the PVAB period to a maximum PVAB period at block 810. The maximum PVAB period may be a duration of 450 to 800 ms, as examples, and can be programmable between 450 ms to 600 ms with 550 ms as a default maximum PVAB period or other predetermined duration that is longer than the minimum PVAB period. The threshold interval and the minimum and maximum PVAB periods may be selected based on an individual patient's heart rate and systolic interval characteristics as well as the amplitude of the motion signal determined during the PVAB as described in any of the examples given above. In this example, control circuit 206 may select the maximum PVAB period when the representative RRI is equal to the threshold interval. It is to be understood that in other examples, control circuit 206 may be configured to select the minimum PVAB period when the representative RRI is equal to the threshold interval.

After setting the PVAB period to the minimum or maximum, control circuit 206 may return to block 802 to identify the next N ventricular events. The PVAB period set to either the minimum at block 808 or the maximum at block 810 may be started in response to each of the next N ventricular events. The current setting of the PVAB period may remain in effect for the next N ventricular events until the next representative RRI is determined. If PVAB period is currently set to the minimum, and the next representative RRI is still less than the threshold interval (block 806), the PVAB period may remain set to the minimum PVAB period at block 808 and be applied following each of the next N ventricular events. If PVAB period is currently set to the maximum, and the next representative RRI is still greater than or equal to the threshold interval (block 806), the PVAB period may remain set to the maximum PVAB period at block 808 and be applied following each of the next N ventricular events. It is to be understood that, depending on the value of the threshold interval, the criteria at block 806 can be less than or equal to the interval threshold in some examples. When the representative RRI changes from being less than the threshold interval to being greater than (or equal to) the threshold interval, or vice versa, control circuit 206 changes the PVAB period from the minimum PVAB period to the maximum PVAB period, or vice versa.

Figure 11:
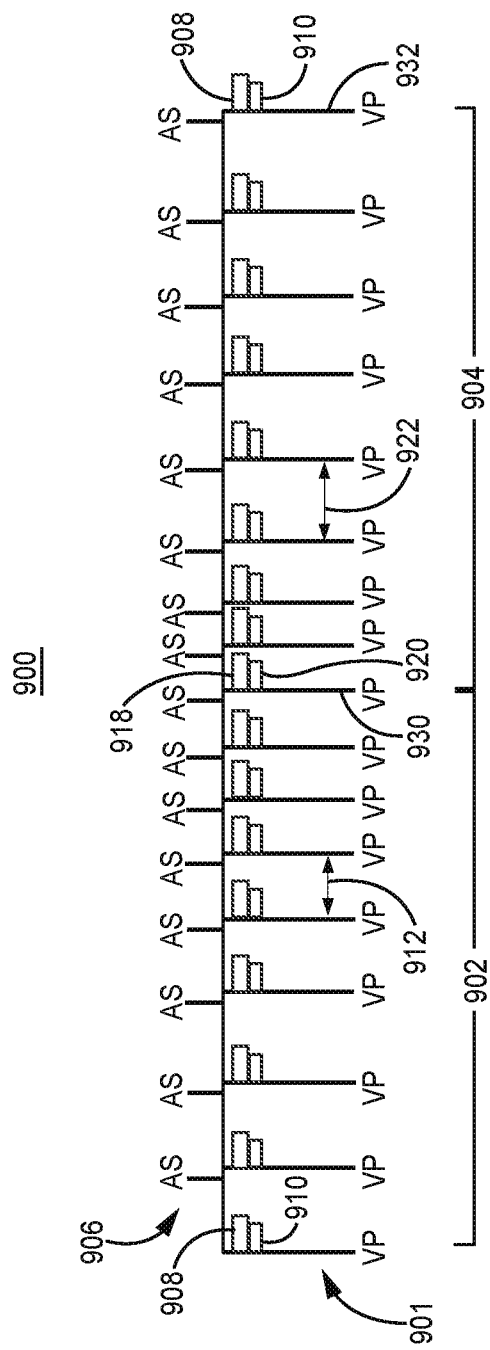
FIG. 11 is a timing diagram of one example of ventricular events and corresponding PVAB periods that are adjusted according to the example techniques of FIG. 10.

FIG. 11 is a timing diagram 900 of one example of ventricular events and corresponding PVAB periods that are adjusted according to the example techniques of FIG. 10. Ventricular events 901 are shown in FIG. 11 as ventricular pacing pulses (VP) that are synchronized to sensed atrial event signals (AS) at an AV pacing interval (not shown in FIG. 11) during an atrial synchronous ventricular pacing mode. It is to be understood however, that in other instances the ventricular events 901 may include all or any number of sensed ventricular events, e.g., R-waves sensed by sensing circuit 204. Furthermore, depending on the pacing mode in effect, control circuit 206 may or may not be sensing atrial events and, if atrial events are being sensed, the ventricular events 901 may or may not be ventricular pacing pulses that are synchronized to sensed atrial events.

The PVAB periods 908 following each of the ventricular events 901 in a first group 902 of N (e.g., 8) RRIs are set to a maximum PVAB period duration. Control circuit 206 may disable atrial event sensing during a corresponding maximum power conservation time period 910 that may be set to end a fixed time interval earlier than the maximum PVAB period 908, e.g., 20 to 100 ms earlier or 85 ms earlier in an example. During the power conservation time period 910, atrial event signal sensing may be disabled, e.g., by disabling or powering off at least one axis of the multi-axis accelerometer included in motion sensor 212.

As described above in conjunction with FIG. 3, atrial event detector circuit 240 may receive one, two or all three axis signals from a three-axis accelerometer included in motion sensor 212. The axis signal(s) selected for producing a motion signal from which atrial event signals are sensed from may be selected by control circuit 206 or programmed by a user. Example techniques for selecting the axis signal(s) used for sensing atrial event signals are generally described in U.S. Publication No. 2020/0179708 (Splett, et al.), incorporated herein by reference in its entirety. When two or three axis signals are received, they may be summed or combined in another way for producing a motion signal from which atrial event signals are sensed.

At least one axis signal used for sensing atrial event signals may be powered down by control circuit 206 for the maximum power conservation time period 910 to conserve power source 214 during the maximum PVAB period 908. The at least one axis signal that is powered down may be powered up again prior to the expiration of the maximum PVAB period 908. In this way, the motion signal that is used for atrial event signal sensing, which may include a combination of one or more accelerometer axis signals, can be passed to control circuit 206 on or just before the expiration of the maximum PVAB period 908. Referring to FIG. 10, at block 810, in addition to setting the maximum PVAB period, control circuit 206 may set the power conservation time period to a maximum time period 910 that is a predetermined time interval shorter than the maximum PVAB period 908. The maximum PVAB period 908 and the maximum power conservation time period 910 may be started by control circuit 206 in response to each ventricular event 901 during a first group 902 of N RRIs.

Control circuit 206 may identify N consecutive ventricular events, each ending an RRI, for determining the first group 902 of N consecutive RRIs. In the example shown, a first group 902 of 8 consecutive RRIs are determined and buffered in memory 210 by control circuit 206. A second group 904 of 8 consecutive RRIs, consecutively following the first group 902, are determined and buffered in memory 210. The second group 904 of 8 RRIs may overwrite the first group 902 in the memory buffer. While the groups 902 and 904 of N RRIs are shown as being consecutive, non-overlapping groups of RRIs in FIG. 11, the groups of N RRIs may be overlapping or running groups of RRIs in other examples. In still other examples, the groups of N RRIs may not be consecutive. For instance, control circuit 206 may identify N consecutive RRIs, e.g., 3 to 12 consecutive RRIs, for determining a representative RRI after every M consecutive ventricular events, e.g., after every 8 to 100 ventricular events or any selected number M that is greater than N. To illustrate, control circuit 206 may determine a representative RRI from the most recent 8 consecutive RRIs after every 30 consecutive RRIs or any other selected number of RRIs that is greater than 8. In this way the PVAB period may be updated based on the N most recent RRIs but can be updated less often than every N RRIs, e.g., once per M RRIs or after a predetermined time interval, e.g., after every 30 seconds, every 60 seconds, every 2 minutes or any other selected time interval.

After the first group 902 of N RRIs, control circuit 206 determines a representative RRI of the group 902. In the example shown, the representative RRI is determined as the fourth shortest RRI 912. Control circuit 206 compares the RRI 912 to a threshold interval for selecting the PVAB period to be applied to the motion signal in response to the next group of ventricular events, e.g., following each ventricular event 901 in the second group 904 of 8 RRIs. In the example shown, control circuit 206 determines that the RRI 912 is less than a threshold interval, e.g., less than 665 ms or any other selected threshold value. In response to the representative RRI 912 being less than the threshold interval, control circuit 206 adjusts the PVAB period from the maximum PVAB period 908 to the minimum PVAB period 918. During the second group 904 of RRIs, control circuit 206 starts the minimum PVAB period 918 in response to each ventricular event 901. The last ventricular event 930 of the first group 902 of RRIs defines the end of the last RRI of the first group 902 and the beginning of the first RRI of the second group 904 of RRIs. As such, the PVAB period set in response to the ventricular event 930 may be set to the minimum PVAB period 918 based on the fourth shortest RRI 912 of the preceding group 902 being less than the threshold interval.

When the PVAB period is set to the minimum PVAB period at block 808 of FIG. 10, control circuit 206 may set a corresponding minimum power conservation time period 920. The minimum power conservation time period 920 may be set to expire a predetermined interval earlier than the minimum PVAB period 918. At least a portion of the motion sensor, e.g., at least one axis of the multi-axis accelerometer, may be disabled or powered down during the power conservation time period to reduce current drain from power source 214. At least one axis of motion sensor 212 may be disabled during the minimum power conservation time period 920 and re-enabled at the expiration of time period 920 so that the motion sensor 212 is producing a motion signal used for sensing atrial event signals by the expiration of the minimum PVAB period 918. It is to be understood that during the power conservation time periods 910 and 920 (and other power conservation time periods described herein), one or more axes of a multi-axis accelerometer included in motion sensor 212 may remain powered on and enabled for producing an acceleration signal that may be used by control circuit 206 for other purposes than sensing atrial event signals.

For example, control circuit 206 may be configured to determine a patient physical activity metric from an acceleration signal, which may be from a single axis of the accelerometer included in motion sensor 212. Control circuit 206 may use the patient physical activity metric for setting a rate response pacing rate, e.g., during a VVIR or VDIR pacing mode. In this case, one axis used for determining the patient physical activity may remain powered on during the power conservation time periods 910 and 920, but one or more other axes used for sensing atrial event signals may be powered off during the power conservation time periods 910 and 920. Accordingly, when the motion sensor is disabled during the power conservation time period, it is to be understood that a portion of the motion sensor, e.g., at least one axis of a multi-axis accelerometer, may be powered down and disabled, and another portion, e.g., a different axis of the multi-axis accelerometer, may remain powered on or enabled during the power conservation time periods 910 and 920 to provide a motion signal to control circuit 206 that may not be used for sensing atrial event signals but may be used for other purposes.

In some instances, the axis signal used for determining patient physical activity may also be used, alone or in combination with one or more additional axis signals, for sensing atrial event signals. In some examples, when one (or more) axis signal(s) is/are used for sensing atrial event signals and the same one (or more) axis signal(s) is/are used for determining a patient physical activity metric, control circuit 206 may keep the accelerometer axis(es) used for monitoring patient physical activity powered on and enabled during the power conservation time periods 910 and 920 (or effectively cancel the power conservation time periods 910 and 920). When a combination of two or more axis signals are used for sensing atrial event signals and one of the two or more axis signals is also used for determining a patient physical activity metric, at least one axis used for atrial event signal sensing that is not used for monitoring patient physical activity may be powered off during the power conservation time periods 910 and 920. In other instances, when the accelerometer axis used for monitoring patient physical activity is not used for atrial event signal sensing, all of the axis signals used for atrial event signal sensing may be powered off during the power conservation time periods 910 and 920. For example, if the accelerometer of motion sensor 212 includes axis 1, axis 2 and axis 3, and axis 1 is used for patient physical activity monitoring and axes 2 and 3 are used for sensing atrial event signals, axes 2 and 3 may be disabled during the power conservation time periods 910 and 920. In another illustrative example, when axis 1 is used for patient physical activity monitoring and axes 1 and 2 are used in combination for atrial event signal sensing, axis 2 may be powered off during power conservation time periods 910 and 920. Techniques that may be used for reducing the current drain of power source 214 during the PVAB period in conjunction with the methods disclosed herein for adjusting the PVAB period are generally disclosed in U.S. Pat. No. 11,207,526 (Sheldon, et al.), incorporated herein by reference in its entirety.

In the example of FIG. 11, a minimum power conservation time period 920 and a maximum power conservation time period 910 are shown. In other examples, a single power conservation time period during which the motion sensor is at least partially disabled during the minimum and maximum PVAB periods to conserve power source 214 may be a fixed time interval shorter than the minimum PVAB period 918. The power conservation time period 920, for example, may not be increased when the maximum PVAB period 908 is applied.

After buffering the RRIs of the second group 904, control circuit 206 determines the representative RRI of the second group 904 as the fourth shortest RRI 922. Control circuit 206 may compare the representative RRI 922 to the threshold interval and, in this example, determine that RRI 922 is greater than the threshold interval. In response to RRI 922 being greater than the threshold interval, control circuit 206 adjusts the PVAB period back to the maximum PVAB period 908 that is started in response to the last ventricular event 932 of the second group 904 of RRIs. Control circuit 206 may additionally set the maximum power conservation time period 910.

In the examples of FIG. 10 and FIG. 11, a single threshold interval is used for selecting whether to set the PVAB period to a maximum or minimum PVAB period. In other examples, more than one threshold interval may be applied to a representative RRI. As described above, multiple ranges of RRIs (corresponding to multiple ventricular rates) may be separated by two or more threshold intervals to enable control circuit 206 to select between a minimum PVAB period, a maximum PVAB period and one or more intermediate PVAB periods.

In still other examples, more than one threshold interval may be used by control circuit 206 for controlling switching between a maximum PVAB period and a minimum PVAB period (or more generally between a relatively longer PVAB period and relatively shorter PVAB period). For instance, when the median RRI (or other representative RRI) is longer than a first threshold interval, the PVAB period may be increased to the maximum PVAB period. When the median RRI falls below a second threshold interval that is less than the first threshold interval, the PVAB period may be decreased to the minimum PVAB period. In this way, a different threshold interval may be used for causing the PVAB period to be increased than the threshold interval used for causing the PVAB period to be decreased.

For instance, with reference to FIG. 10, control circuit 206 may select the RRI threshold interval at block 806, e.g., by selecting from a first, relatively longer threshold interval and a second, relatively shorter threshold interval based on the current duration of the PVAB period. When the PVAB period is at the minimum duration, the relatively longer RRI threshold interval may be selected for determining when to increase the PVAB period to the maximum duration. When the PVAB period is currently set at the maximum duration, the relatively shorter RRI threshold interval may be selected for determining when to decrease the PVAB period to the minimum duration. By using two different threshold intervals for switching between two different PVAB period durations, a hysteresis effect may be employed to reduce the likelihood of frequent adjustments to the PVAB period during a fluctuating heart rate, e.g., when the representative RRI is going back and forth from being greater than to being less than a single threshold interval.

In other examples, frequent adjustments between the maximum and minimum PVAB periods may be avoided by using a relatively higher number of RRIs, e.g., 12 to 30 RRIs, for determining the representative RRI that is compared to the threshold interval. In still other examples, frequent adjustments to the PVAB period may be avoided by allowing an adjustment to occur only after a predetermined number of RRIs, e.g., 20 to 100 RRIs or any other selected number of RRIs (which may be a greater number of RRIs than the number of RRIs used to determine the median or other representative RRI). In another example, the PVAB period may be adjusted at scheduled predetermined time intervals, e.g., no more than once every 30 seconds, once every 60 seconds or any other selected time interval.

All ventricular events are shown as ventricular pacing pulses in the example of FIG. 11. As mentioned previously herein, the PVAB period (and an associated power conservation period) may be set differently following a ventricular pacing pulse than following a ventricular event sensed by sensing circuit 204. As such, one of a post-pace maximum PVAB period or a post-pace minimum PVAB period may be selected based on a representative RRI determined from a first group of RRIs (being greater than or less than a threshold interval), and the selected post-pace PVAB period (minimum or maximum) may be started in response to each ventricular pacing pulse that occurs during a second group of RRIs following the first group of RRIs. Additionally, one of a post-sense maximum PVAB period or a post-sense minimum PVAB period may be selected based on the representative RRI determined from the first group of RRIs, and the selected post-sense PVAB period (maximum or minimum) may be started in response to each ventricular event sensed by sensing circuit 204 that occurs during the second group of RRIs following the first group of RRIs.

The post-pace maximum and post-sense maximum PVAB periods may be different from each other. Control circuit 206 may select the maximum PVAB periods based on a representative RRI being greater than or equal to the threshold interval, but one or the other post-pace or post-sense maximum PVAB period is started in response to an individual ventricular event based on whether that ventricular event is a pacing pulse or a sensed event. The post-pace minimum and post-sense minimum PVAB periods may be different from each other. Control circuit 206 may select the minimum PVAB periods based on a representative RRI being less than the threshold interval, but one or the other post-pace or post-sense minimum PVAB period is started in response to a given ventricular event based on whether that ventricular event is a pacing pulse or a sensed event.

In some examples, one of the maximum PVAB periods or the minimum PVAB periods may be the same post-sense or post-pace. For example, a different post-pace maximum PVAB period may be set than the post-sense maximum PVAB period, but the post-pace minimum PVAB period and the post-sense minimum PVAB period may be equal. In another example, a different post-pace minimum PVAB period may be set than the post-sense minimum PVAB period, but the post-pace maximum and the post-sense maximum PVAB periods may be equal.

Figure 12:
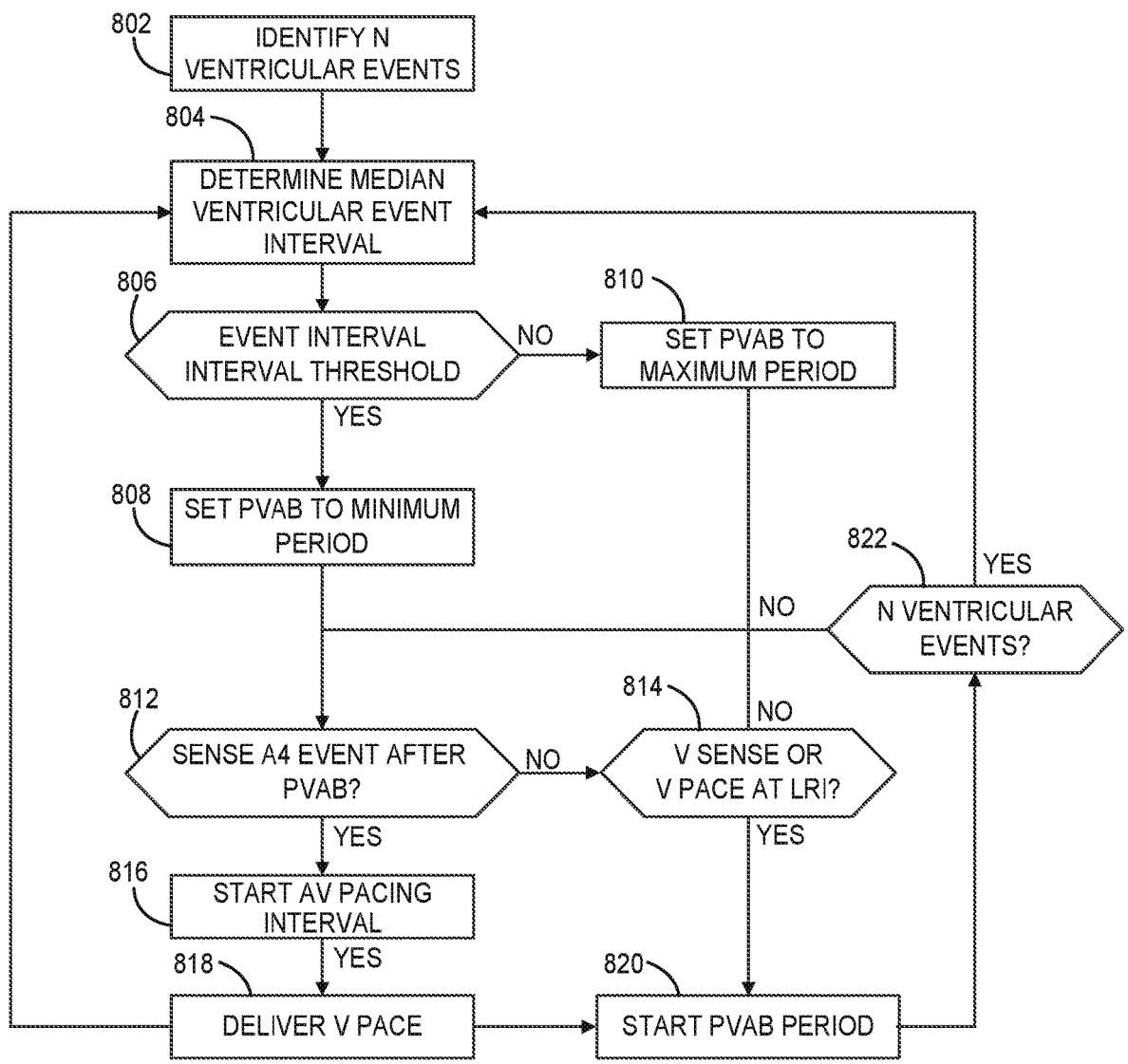
FIG. 12 is a flow chart of a method for adjusting the PVAB period and controlling atrial synchronized ventricular pacing according to one example.

FIG. 12 is a flow chart 850 of a method for adjusting the PVAB period and controlling atrial synchronized ventricular pacing according to one example. Blocks 802 through 810 correspond to identically numbered blocks shown in FIG. 10 and described above. After selecting the maximum or minimum PVAB period at block 808 or 810, control circuit 206 starts the selected PVAB period in response to the next ventricular event and determines if the atrial event signal (A4 event) is sensed from the motion signal after the PVAB period at block 812. As described above, e.g., in conjunction with FIG. 5 or FIG. 7, control circuit 206 may sense the atrial event signal from the motion signal after the expiration of the PVAB period in response to the earliest A4 sensing threshold crossing of either the first, higher A4 sensing threshold amplitude during the A3 window or the second, lower A4 sensing threshold amplitude after the A3 window.

In response to sensing the atrial event signal outside the PVAB period, control circuit 206 may generate an output at block 816, e.g., an atrial sensed event signal, that may be stored by memory 82, e.g., with a time stamp. Atrial sensed event signals and associated data, such as an atrial sensed event interval, may be determined and stored in memory 210 for use in various functions such as automatically setting or adjusting atrial sensing control parameters, determining an atrial rate, controlling pacing mode switching or other functions.

It is to be understood that in any of the examples presented herein, control circuit 206 may start a post-ventricular atrial refractory period (PVARP) in response to each ventricular event in addition to starting the PVAB period. The PVARP may expire later than the PVAB period and may expire during the passive ventricular filling (A3) window 424 shown in FIG. 5 in some examples. Control circuit 206 may sense an atrial event signal after the PVAB period expires but before the expiration of the PVARP during some ventricular cycles. Control circuit 206 may generate a refractory atrial sensed event signal at block 816, e.g., for storing in memory 210 for determining an atrial rate or other diagnostic or sensing and/or therapy control purposes. When the atrial event signal is sensed after the expiration of the PVAB period but during a PVARP, pace timing circuit 242 may withhold starting the AV pacing interval in response to the refractory sensed atrial event signal.

When the atrial event signal is sensed outside the PVAB period and any PVARP, the pace timing circuit 242 (FIG. 3) may receive the atrial sensed event signal from the atrial event detector circuit 240 at block 816 and, in response, start the AV pacing interval. Pulse generator 202 generates and delivers an atrial synchronous ventricular pacing pulse in response to the sensed atrial event signal, e.g., upon expiration of the AV pacing interval, at block 818. In response to the delivered ventricular pacing pulse, control circuit 206 starts the PVAB period at block 820, set to either the minimum or maximum PVAB period previously selected at block 808 or 810. The ventricular pacing pulse delivered at block 818 is identified by control circuit 206 as a ventricular event of the next group of N ventricular events and may determine if N ventricular events have been identified at block 822, corresponding to the next group of N RRIs buffered in memory 210.

Referring again to block 812, if the atrial event signal is not sensed at block 812 before another ventricular event is identified at block 814, control circuit 206 may identify the ventricular event at block 814 and start the PVAB period at block 820 in response to the identified ventricular event (without delivering an atrial synchronized ventricular pacing pulse). If a ventricular event has not yet occurred, control circuit 206 may return to block 812 to continue waiting for a sensed atrial event signal or a ventricular event, whichever occurs first. In some instances, a ventricular event is sensed by sensing circuit 204 at block 814 before the atrial event signal is sensed. In other instances, a ventricular lower rate pacing interval may expire before the atrial event signal is sensed. An asynchronous ventricular pacing pulse may be delivered at the lower rate pacing interval (LRI) at block 814. Control circuit 206 may identify the ventricular sensed event or ventricular pacing pulse as a ventricular event and start the PVAB period at block 820.

At block 822, control circuit 206 may determine if the next N ventricular events have been identified. If not, control circuit 206 may return to block 812 and continue to set the PVAB period according to the current maximum or minimum period most recently selected (at block 808 or 810). When the next N ventricular events are identified at block 822, control circuit 206 may return to block 804 to determine the representative RRI from the N ventricular events. Control circuit 206 sets the PVAB period to the minimum period or the maximum period at one of blocks 808 or 810 based on the comparison of the threshold interval to the most recently determined representative RRI.

In the example of FIG. 12, control circuit 206 may adjust the PVAB period between a maximum PVAB period and a minimum PVAB period based on an RRI, which may be a representative RRI determined from multiple RRIs. The PVAB period may be adjusted from the maximum PVAB period to the minimum PVAB period without requiring an analysis of the amplitude of the motion signal during the maximum PVAB period in some examples. In other examples, techniques described herein for determining motion signal amplitude data during the PVAB period may be performed by control circuit 206 to analyze the amplitude of the motion signal during the maximum PVAB period, e.g., before shortening to the minimum PVAB period based on a representative RRI being less than a threshold interval. The techniques generally described in conjunction with FIGS. 10 through 12 may be combined with any of the example techniques disclosed herein for analyzing the motion signal amplitude prior to making a decision by control circuit 206 to shorten or lengthen the PVAB period and/or by how much the PVAB period is shortened or lengthened (e.g., a maximum decrement or increment).

It should be understood that, depending on the example, certain acts or events of any of the methods described herein can be performed in a different sequence, may be added, merged, or left out altogether (e.g., not all described acts or events are necessary for the practice of the method). Moreover, in certain examples, acts or events may be performed concurrently, e.g., through multi-threaded processing, interrupt processing, or multiple processors, rather than sequentially. In addition, while certain aspects of this disclosure are described as being performed by a single circuit or unit for purposes of clarity, it should be understood that the techniques of this disclosure may be performed by a combination of units or circuits associated with, for example, a medical device.

In one or more examples, the functions described may be implemented in hardware, software, firmware, or any combination thereof. If implemented in software, the functions may be stored as one or more instructions or code on a computer-readable medium and executed by a hardware-based processing unit. Computer-readable media may include computer-readable storage media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors, application specific integrated circuits (ASICs), field programmable logic arrays (FPLAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

Thus, a medical device has been presented in the foregoing description with reference to specific examples. It is to be understood that various aspects disclosed herein may be combined in different combinations than the specific combinations presented in the accompanying drawings. It is appreciated that various modifications to the referenced examples may be made without departing from the scope of the disclosure and the following claims.

What is claimed is:

1. A medical device comprising:
   a motion sensor configured to sense a motion signal;
   a pulse generator configured to generate ventricular pacing pulses; and
   a control circuit in communication with the motion sensor and the pulse generator, the control circuit configured to:
      identify a first plurality of cardiac events;
      determine a first cardiac event interval based on the first plurality of cardiac events;
      determine whether the first cardiac event interval is:
         less than a threshold interval; or
         greater than the threshold interval;
      select one of:
         a first blanking period duration if the first cardiac event interval is less than the threshold interval; or
         a second blanking period duration if the first cardiac event interval is greater than the threshold interval, the second blanking period duration being greater than the first blanking period duration;
      identify a second plurality of cardiac events after the first plurality of cardiac events;
      apply a post-ventricular atrial blanking period to the motion signal during the second plurality of cardiac events, the post-ventricular atrial blanking period being set to the selected one of the first blanking period duration or the second blanking period duration; and
      sense an atrial event signal from the motion signal after an expiration of the post-ventricular atrial blanking period; and
   wherein the pulse generator is configured to generate a ventricular pacing pulse in response to the control circuit sensing the atrial event signal.

2. The medical device of claim 1, wherein the control circuit is further configured to:
   determine a second cardiac event interval from the second plurality of cardiac events;
   compare the second cardiac event interval to the threshold interval;
   based on the comparison of the second cardiac event interval to the threshold interval, select one of:
      the first blanking period duration in response to the second cardiac event interval being less than the threshold interval; or
      the second blanking period duration in response to the second cardiac event interval being greater than the threshold interval;
   identify a third plurality of cardiac events after the second plurality of cardiac events; and
   apply the post-ventricular atrial blanking period to the motion signal during the third plurality of cardiac events, where the post-ventricular atrial blanking period is set to one of the first blanking period duration or the second blanking period duration that is selected based on the comparison of the second cardiac event interval to the threshold interval.

3. The medical device of claim 1, wherein the control circuit is further configured to identify the first plurality of cardiac events by identifying at least one ventricular pacing pulse generated by the pulse generator.

4. The medical device of claim 1, further comprising a sensing circuit configured to receive a cardiac electrical signal and sense ventricular events from the cardiac electrical signal;
   wherein the control circuit is configured to identify the first plurality of cardiac events by identifying at least one ventricular event sensed by the sensing circuit.

5. The medical device of claim 1, wherein the control circuit is further configured to
   generate an output in response to sensing the atrial event signal;
   the medical device further comprising a memory in communication with the control circuit, the memory configured to store the output generated by the control circuit in response to sensing the atrial event signal.

6. The medical device of claim 1, wherein the control circuit is further configured to:
   set a power conservation time period during the post-ventricular atrial blanking period; and
   disable at least a portion of the motion sensor during the power conservation time interval.

7. The medical device of claim 6, wherein the control circuit is further configured to set the power conservation time period to expire a predetermined time interval earlier than the post-ventricular atrial blanking period that is set to the selected one of the first blanking period duration or the second blanking period duration.

8. The medical device of claim 1, wherein the control circuit is further configured to:
   determine when the first cardiac event interval is less than the threshold interval;
   in response to the first cardiac event interval being less than the threshold interval, determine an amplitude of the motion signal during at least one post-ventricular atrial blanking period;
   determine that the amplitude is greater than a threshold amplitude;
   in response to the amplitude being greater than the threshold amplitude, withhold selecting the first blanking period duration in response to the first cardiac event interval being less than the threshold interval; and
   select the second blanking period in response to determining that the amplitude of the motion signal is greater than the threshold amplitude when the first cardiac event interval is less than the threshold interval.

9. The medical device of claim 1, wherein the control circuit is further configured to:
   determine an amplitude of the motion signal; and
   set the first blanking period duration based on the amplitude of the motion signal.

10. The medical device of claim 1, wherein the control circuit is further configured to:
    determine a time of one of a peak amplitude or a threshold amplitude crossing of the motion signal; and
    set the first blanking period duration based on the determined time.

11. The medical device of claim 1, wherein the control circuit is further configured to select the threshold interval from one of a first longer threshold interval and a second shorter threshold interval based on a current duration of the post-ventricular atrial blanking period.

12. A method, comprising:
    sensing a motion signal;
    identifying a first plurality of cardiac events;
    determining a first cardiac event interval based on the first plurality of cardiac events;
    determining whether the first cardiac event interval is:

less than a threshold interval; or
greater than the threshold interval;
selecting one of:
a first blanking period duration if the first cardiac event interval is less than the threshold interval; or
a second blanking period duration if the first cardiac event interval is greater than the threshold interval, the second blanking period duration being greater than the first blanking period duration;
identifying a second plurality of cardiac events after the first plurality of cardiac events;
applying a post-ventricular atrial blanking period to the motion signal during the second plurality of cardiac events, the post-ventricular atrial blanking period being set to the selected one of the first blanking period duration or the second blanking period duration;
sensing an atrial event signal from the motion signal after an expiration of the post-ventricular atrial blanking period; and
generating a ventricular pacing pulse in response to sensing the atrial event signal.

13. The method of claim 12, further comprising:
determining a second cardiac event interval from the second plurality of cardiac events;
comparing the second cardiac event interval to the threshold interval;
based on the comparing of the second cardiac event interval to the threshold interval, selecting one of:
the first blanking period duration in response to the second cardiac event interval being less than the threshold interval; or
the second blanking period duration in response to the second cardiac event interval being greater than the threshold interval;
identifying a third plurality of cardiac events after the second plurality of cardiac events; and
applying the post-ventricular atrial blanking period to the motion signal during the third plurality of cardiac events, where the post-ventricular atrial blanking period is set to the selected one of the first blanking period duration or the second blanking period duration that is selected based on the comparison of the second cardiac event interval to the threshold interval.

14. The method of claim 12, further comprising:
generating ventricular pacing pulses; and
identifying the first plurality of cardiac events by identifying at least one ventricular pacing pulse.

15. The method of claim 12, further comprising:
receiving a cardiac electrical signal;
sensing ventricular events from the cardiac electrical signal; and
identifying the first plurality of cardiac events by identifying at least one ventricular event sensed by the sensing circuit.

16. The method of claim 12, further comprising
generating an output in response to sensing the atrial event signal; and
storing in a memory the output generated in response to sensing the atrial event signal.

17. The method of claim 12, further comprising:
setting a power conservation time period during the post-ventricular atrial blanking period; and
disabling at least a portion of the motion sensor during the power conservation time interval.

18. The method of claim 17, further comprising setting the power conservation time period to expire a predetermined time interval earlier than the post-ventricular atrial blanking period.

19. The method of claim 12, further comprising:
determining when the first cardiac event interval is less than the threshold interval;
in response to the first cardiac event interval being less than the threshold interval, determining an amplitude of the motion signal during at least one post-ventricular atrial blanking period;
determining that the amplitude is greater than a threshold amplitude;
in response to the amplitude being greater than the threshold amplitude, withholding selecting the first blanking period duration in response to the first cardiac event interval being less than the threshold interval; and
selecting the second blanking period in response to determining that the amplitude of the motion signal is greater than the threshold amplitude when the first cardiac event interval is less than the threshold interval.

20. The method of claim 12, further comprising:
determining an amplitude of the motion signal; and
setting the first blanking period duration based on the amplitude of the motion signal.

21. The method of claim 12, further comprising:
determining a time of one of a peak amplitude or a threshold amplitude crossing of the motion signal; and
setting the first blanking period duration based on the determined time.

22. The method of claim 12, further comprising selecting the threshold interval from one of a first threshold interval and a second threshold interval that is shorter than the first threshold interval based on a current duration of the post-ventricular atrial blanking period.

23. A non-transitory, computer-readable medium storing a set of instructions that, when executed by a control circuit of a medical device, cause the medical device to:
sense a motion signal;
identify a first plurality of cardiac events;
determine a first cardiac event interval based on the first plurality of cardiac events;
determine whether the first cardiac event interval is:
less than a threshold interval; or
greater than the threshold interval;
select one of:
a first blanking period duration if the first cardiac event interval is less than the threshold interval; or
a second blanking period duration if the first cardiac event interval is greater than the threshold interval, the second blanking period duration being greater than the first blanking period duration;
identify a second plurality of cardiac events after the first plurality of cardiac events;
apply a post-ventricular atrial blanking period to the motion signal during the second plurality of cardiac events, the post-ventricular atrial blanking period being set to the selected one of the first blanking period duration or the second blanking period duration;
sense an atrial event signal from the motion signal after an expiration of the post-ventricular atrial blanking period; and
generate a ventricular pacing pulse in response to sensing the atrial event signal.

* * * * *